US010257582B2

(12) United States Patent
Ramalingam et al.

(10) Patent No.: US 10,257,582 B2
(45) Date of Patent: Apr. 9, 2019

(54) DISPLAY CONTROL SYSTEM AND METHOD TO GENERATE A VIRTUAL ENVIRONMENT IN A VEHICLE

(71) Applicant: SONY CORPORATION, Tokyo (JP)

(72) Inventors: Prabakaran Ramalingam, Karnataka (IN); Awadh Bihari Mohan, Karnataka (IN)

(73) Assignee: SONY CORPORATION, Tokyo (JP)

( * ) Notice: Subject to any disclaimer, the term of this patent is extended or adjusted under 35 U.S.C. 154(b) by 196 days.

(21) Appl. No.: 15/462,600

(22) Filed: Mar. 17, 2017

(65) Prior Publication Data

US 2018/0270542 A1    Sep. 20, 2018

(51) Int. Cl.
| | | |
|---|---|---|
| *H04N 21/485* | (2011.01) | |
| *B60R 1/00* | (2006.01) | |
| *G02B 27/01* | (2006.01) | |
| *G05D 1/00* | (2006.01) | |
| *H04L 29/08* | (2006.01) | |
| *H04N 7/01* | (2006.01) | |
| *H04N 21/258* | (2011.01) | |
| *H04N 21/414* | (2011.01) | |
| *B60W 50/14* | (2012.01) | |
| *B60K 35/00* | (2006.01) | |

(52) U.S. Cl.
CPC ......... *H04N 21/4858* (2013.01); *B60K 35/00* (2013.01); *B60R 1/00* (2013.01); *B60W 50/14* (2013.01); *G02B 27/0101* (2013.01); *G05D 1/0088* (2013.01); *H04L 67/12* (2013.01); *H04N 7/0127* (2013.01); *H04N 21/25841* (2013.01); *H04N 21/41422* (2013.01); *B60R 2300/205* (2013.01); *B60R 2300/305* (2013.01); *B60W 2520/10* (2013.01); *B60W 2550/12* (2013.01); *B60W 2550/146* (2013.01); *B60W 2550/20* (2013.01); *G02B 2027/014* (2013.01); *G02B 2027/0138* (2013.01)

(58) Field of Classification Search
CPC .. H04N 21/4858; H04N 67/12; H04N 7/0127; B60K 35/00; B60R 1/00; B60W 50/14
USPC ......................................................... 348/121
See application file for complete search history.

(56) References Cited

U.S. PATENT DOCUMENTS

| | | | | |
|---|---|---|---|---|
| 2014/0309813 A1* | 10/2014 | Ricci | ....................... | B60Q 1/00 701/2 |
| 2014/0309863 A1* | 10/2014 | Ricci | .................. | G01C 21/3484 701/36 |

FOREIGN PATENT DOCUMENTS

JP        2009-284004 A        12/2009

* cited by examiner

*Primary Examiner* — Nguyen T Truong
(74) *Attorney, Agent, or Firm* — Chip Law Group

(57) ABSTRACT

A display control system to generate a virtual environment in a vehicle includes an electronic control unit (ECU) configured to receive an input that corresponds to a selection of a video to be displayed on one or more display mediums provided in the vehicle. A relevance factor is determined between a current travel route of the vehicle and a travel route associated with the selected video. The relevance factor is determined in an event the vehicle is in motion along the current travel route. One or more video parameters of the selected video are adjusted based on the determined relevance factor. Display of at least the selected video on the one or more display mediums is controlled in the vehicle in motion in accordance with the adjusted one or more video parameters of the selected video.

20 Claims, 14 Drawing Sheets

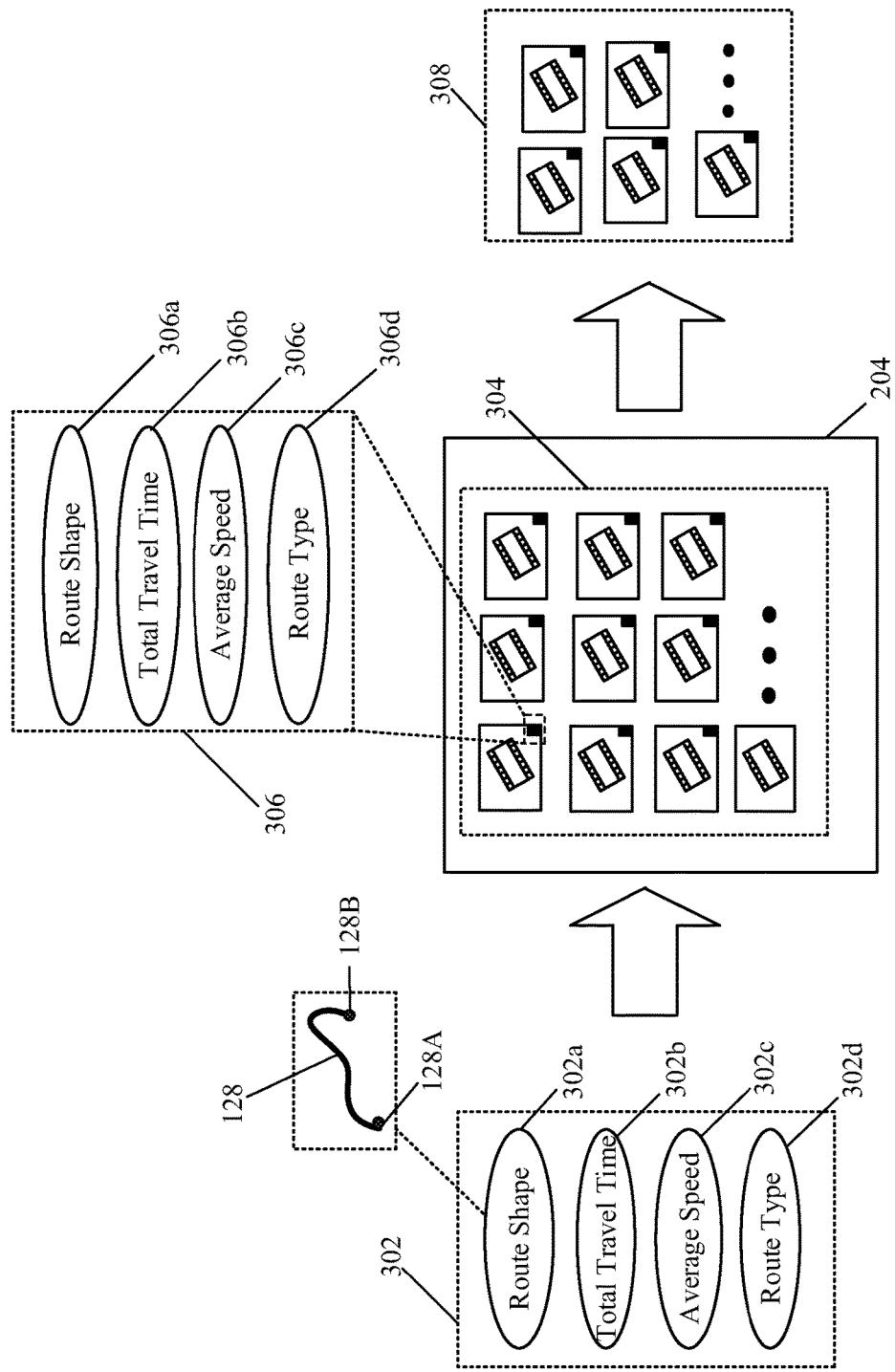

DISPLAY CONTROL SYSTEM AND METHOD TO GENERATE A VIRTUAL ENVIRONMENT IN A VEHICLE

CROSS-REFERENCE TO RELATED APPLICATIONS/INCORPORATION BY REFERENCE

None.

FIELD

Various embodiments of the disclosure relate to a display control system and method for a vehicle. More specifically, various embodiments of the disclosure relate to display control system and method to generate a virtual environment in an autonomous or a semi-autonomous vehicle.

BACKGROUND

Currently, autonomous vehicle technology and associated automotive electronics are one of the most burgeoning segments in the automotive industry. Various experiments are conducted related to the development of automotive electronics for use in vehicles, such as autonomous cars. Currently, vehicles with the autonomous drive capability are primarily evaluated for error free drive and for advanced driver assistance systems (ADAS). However, development of technologies and systems related to enhancement of in-vehicle experience of commuters during a drive of such vehicles with the autonomous drive capability, is still at a nascent stage. In certain scenarios, a commuter inside the vehicle may not like the external or internal environment from within the vehicle. Thus, an advanced, intelligent, and a self-adaptive display system may be desired to provide a virtual environment of choice to the commuters inside the vehicle during a drive.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A display control system and method to generate a virtual environment in a vehicle substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A to 3F illustrate various operations of the disclosed display control system and method to generate a virtual environment in a vehicle, in accordance with an embodiment of the disclosure.

DETAILED DESCRIPTION

Figure 1:
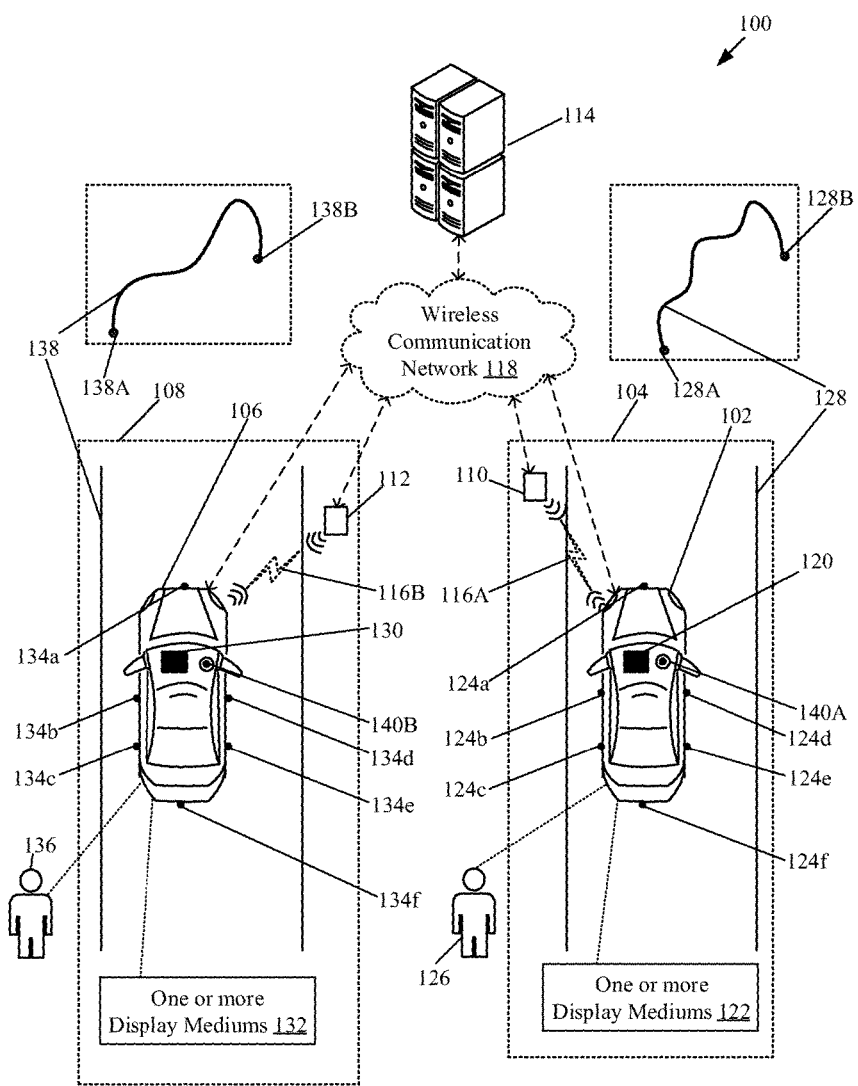
FIG. 1 is a block diagram that illustrates a network environment for a vehicle, in accordance with an embodiment of the disclosure.

The following described implementations may be found in the disclosed display control system and method to generate a virtual environment in a vehicle. Exemplary aspects of the disclosure may comprise a method that may include receipt of an input by an electronic control unit (ECU) of a vehicle. The vehicle may be an autonomous vehicle or a semi-autonomous vehicle. The input may correspond to a selection of a video to be displayed on one or more display mediums in the vehicle. A relevance factor may be determined between a current travel route of the vehicle and a travel route associated with the selected video. The relevance factor may be determined in an event the vehicle is in motion along the current travel route. The ECU may be configured to adjust one or more video parameters of the selected video based on the determined relevance factor. The ECU may be further configured to control display of at least the selected video on the one or more display mediums in the vehicle in motion in accordance with the adjusted one or more video parameters of the selected video.

In accordance with an embodiment, the relevance factor may be determined based on a curvature parameter between the current travel route and the travel route associated with the selected video. The relevance factor may refer to a ratio between a first degree of curvature of a portion of the current travel route of the vehicle and a second degree of curvature of a corresponding portion of the travel route associated with the selected video.

In accordance with an embodiment, the ECU may be configured to receive input information that includes at least the current travel route to be undertaken by the vehicle. The ECU may be configured to retrieve a first set of videos, from a memory and/or an external communication device communicatively coupled to the ECU. The first set of videos may be retrieved based on a similarity search of the input information against tagged information of a plurality of tagged videos stored in the memory and/or the external communication device. The ECU may be configured to compare a route shape of the current travel route included in the input information to a plurality of route shapes associated with the plurality of tagged videos for the retrieval of the first set of videos.

In accordance with an embodiment, the retrieved first set of videos may be filtered based on one or more criteria. The one or more criteria may correspond to sensor data extracted from an in-vehicle network of the vehicle and/or passenger information of one or more passengers in the vehicle. The sensor data may correspond to a traffic condition and a weather condition detected by a plurality of sensors provided in the vehicle during motion of the vehicle along the current travelling route. The ECU may be configured to assign a priority to the one or more criteria for the filtration of the retrieved first set of videos.

In accordance with an embodiment, a refined set of videos may be displayed on an interface rendered on a display medium of the one or more display mediums provided within the vehicle. The display of the refined set of videos may occur based on the filtration of the first set of videos. The input that corresponds to the selection of the video may refer to the selection of one of the refined set of videos displayed on the interface.

In accordance with an embodiment, the adjustment of the one or more video parameters of the selected video may be executed based on a current speed of the vehicle. The adjustment of the one or more video parameters of the selected video may correspond to a dynamic adjustment of a frame rate of the selected video during display of the selected video on the one or more display mediums in the vehicle in motion. The dynamic adjustment of a frame rate may be executed based on the determined relevance factor. Alternatively, the adjustment of the one or more video parameters of the selected video further corresponds to a dynamic adjustment of brightness values or audio of one or more video segments of the selected video. The dynamic adjustment of brightness values or audio may be performed during display of the selected video on the one or more display mediums in the vehicle in motion.

In accordance with an embodiment, the one or more display mediums in the vehicle may be arranged such that a natural view of an external environment of the vehicle is selectively restricted to one or more passengers from within the vehicle. The natural view may refer to an actual view of the external environment visible to a user from within the vehicle. The natural view of an external environment of the vehicle may be selectively restricted during display of the selected video on the one or more display mediums in the vehicle in motion. The ECU may be configured to control display of the selected video in the vehicle in motion along the current travel route in a first geographical area, such that a virtual environment of a second geographic area related to the travel route of the selected video is created within the vehicle during the display of the selected video.

In accordance with an embodiment, an augmented-reality view may be generated on one or more windows and/or windshields of the vehicle. The one or more windows and/or windshields may correspond to the one or more display mediums. The augmented-reality view may include a view of the selected video superimposed on one or more external objects. The one or more external objects outside the vehicle may be captured by one or more video-capture units provided in the vehicle.

FIG. 1 is a block diagram that illustrates a network environment to generate a virtual environment for a vehicle, in accordance with an embodiment of the disclosure. With reference to FIG. 1, there is shown an exemplary network environment 100. The exemplary network environment 100 may include one or more vehicles, such as a vehicle 102, in a first geographical area 104. The network environment 100 may also include one or more other vehicles, such as a vehicle 106, in a second geographical area 108. There is also shown one or more external communication devices, such as a first communication device 110, a second communication device 112, and a central communication device, such as a server 114, a first wireless communication channel 116A, a second wireless communication channel 116B, and a wireless communication network 118.

The vehicle 102 may include an electronic control unit (ECU) 120, one or more display mediums 122, and a plurality of video-capture units, such as video-capture units 124a to 124f. There is further shown a first user 126 associated with the vehicle 102 that may be in motion along a first travel route 128 in the first geographical area 104. The vehicle 106 may also include an ECU 130, one or more display mediums 132, and a plurality of video-capture units, such as video-capture units 134a to 134f. There is further shown a second user 136 associated with the vehicle 106 that may be in motion along a second travel route 138 in the second geographical area 108. A first inner camera 140A may be installed in the interior of the vehicle 102 to capture one or more images or video of in-vehicle users, such as passengers, of the vehicle 102. Similarly, a second inner camera 140B may be installed in the interior of the vehicle 106 to capture one or more images or video of in-vehicle users, such as passengers, of the vehicle 106.

The vehicle 102 may refer to an autonomous vehicle or a semi-autonomous vehicle. The vehicle 102 may travel along the first travel route 128 in the first geographical area 104. Examples of the vehicle 102 may include, but are not limited to, a car, a hybrid vehicle, and/or a vehicle with an autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. For example, the National Highway Traffic Safety Administration (NHTSA) in the United States proposes a classification for driving system as follows. The system and method of the present disclosure may be applied to vehicles with an autonomous function such as autonomous braking, autonomous cruise control, autonomous driving, etc. In the following examples, the system and method of the present disclosure may also be applied for vehicles from Level 1 to Level 4. According to the NHTSA, in "Level 0" category of vehicles, the driver completely controls the vehicle at all times. In "Level 1" category, individual vehicle controls may be automated, such as electronic stability control or automatic braking. In "Level 2" category, at least two controls may be automated together concurrently or simultaneously, such as an adaptive cruise control together with a lane keeping control. In "Level 3" category, the level of autonomous control increases, where a vehicle may perform safety-critical functions in certain conditions. The vehicle may sense when conditions require the driver to retake control and provides a "sufficiently comfortable transition time" for the driver to do so. In "Level 4" category, the vehicle may perform all safety-critical functions where the driver is not expected to control the vehicle at any time. As this category of vehicle may control all functions from start to stop, including all parking functions, it may be a driverless vehicle (also referred to as self-driving vehicle or an autonomous vehicle).

The first geographical area 104 may refer to a geographical area within a city, a state, province, a country, or other regional designation, which includes a current travel route, such as the first travel route 128, undertaken by the vehicle 102. For example, the first user 126 may want to begin an autonomous ride from a current location, such as a start location 128A, of the vehicle 102 to a destination location 128B. To begin an autonomous drive, it may be required to at least feed the destination location 128B by use of a navigation unit (not shown) of the vehicle 102. The navigation unit may calculate a route from the start location 128A to the destination location 128B to be undertaken by the vehicle 102 during the autonomous ride. This route calculated at the start of a ride may be considered a current travel route, such as the first travel route 128, of the vehicle 102. Thus, the geographical area that surrounds the vehicle 102 as the vehicle 102 moves along the current travel route, such as the first travel route 128, may be considered the first geographical area 104. The ECU 120 of the vehicle 102 may receive the input information that includes the current travel route, such as the first travel route 128, to be undertaken by the vehicle 102, from the navigation unit, via an in-vehicle network of the vehicle 102.

The vehicle 106 may refer to an autonomous vehicle, a semi-autonomous vehicle, or a non-autonomous vehicle. The vehicle 106 may travel along the second travel route 138 in the second geographical area 108. Examples of the vehicle 106 may include, but are not limited to, a car, a hybrid vehicle, and/or a vehicle with or without an autonomous drive capability that uses one or more distinct renewable or non-renewable power sources. Examples of the renewable or non-renewable power sources may include fossil fuel, electric propulsion, hydrogen fuel, solar-power, and/or other forms of alternative energy.

The second geographical area 108 may refer to a geographical area different from the first geographical area 104. The second geographical area 108 may include a travel route, such as the second travel route 138, undertaken by a different vehicle, such as the vehicle 106, or the same vehicle, such as the vehicle 102, but at a different point in time. The second geographical area 108 may refer to a different area of the same city as that of the first geographical area 104 or a different city, state, or country. The geographical area that surrounds the vehicle 106 as the vehicle 106 moves along the second travel route 138, may be considered as the second geographical area 108.

The first communication device 110 may comprise suitable logic, circuitry, interfaces, and/or code that may be configured to communicate with the vehicle 102, via the first wireless communication channel 116A, such as a dedicated short-range communication (DSRC) channel or other short or medium range wireless communication channel. The first communication device 110 may also communicate with the central communication device, such as the server 114, via the wireless communication network 118. The first communication device 110 may comprise one or more sensors, such as a geospatial position detection sensor, a movement detection sensor, and/or a speed sensor to detect a position, a movement, or a speed of a vehicle, such as the vehicle 102, from a defined proximal distance. The first communication device 110 may be configured to receive/transmit one or more videos from/to a wireless communication system of the vehicle 102. Examples of first communication device 110 may include, but are not limited to, a road side unit (RSU), a mobile device, a wearable device worn by a user of the vehicle 102, such as a smart-glass, and/or a communication device removably coupled to the vehicle 102.

The second communication device 112 may comprise suitable logic, circuitry, interfaces, and/or code that may be configure to communicate with the vehicle 106, via the second wireless communication channel 116B, such as a dedicated short-range communication (DSRC) channel or other short or medium range wireless communication channel. The second communication device 112 may also communicate with the central communication device, such as the server 114, via the wireless communication network 118. The second communication device 112 may be configured to receive/transmit one or more videos from/to a wireless communication system of the vehicle 106. Examples of the second communication device 112 may be similar to that of the first communication device 110.

The server 114 may comprise suitable logic, circuitry, interfaces, and/or code that may be configured to establish a communication channel with the one or more vehicles, such as the vehicles 102 and 106. The server 114 may be configured to store a plurality of tagged videos that are tagged with additional information. The server 114 may also store a plurality of videos that may not be tagged with additional information. The plurality of tagged videos may be received from the various vehicles, such as the vehicles 102 and 106, or the communication devices, such as the first communication device 110 and/or the second communication device 112. The server 114 may be a cloud server, a web server, a database server, a file server, an application server, or a combination thereof. The server 114 may be implemented by use of several technologies that are well known to those skilled in the art.

The first wireless communication channel 116A may include a short or a medium range communication medium through which the vehicle 102 may communicate with one or more other vehicles and/or the first communication device 110. Examples of the first wireless communication channel 116A may include, but are not limited to, a dedicated short-range communication (DSRC) network, a mobile ad-hoc network (MANET), a vehicular ad-hoc network (VANET), Intelligent vehicular ad-hoc network (In-VANET), Internet based mobile ad-hoc networks (IMANET), a wireless sensor network (WSN), a wireless mesh network (WMN), the Internet, a cellular network, such as a long-term evolution (LTE) network, a Wireless Fidelity (Wi-Fi) network, and/or a Wireless Local Area Network (WLAN). Various devices in the network environment 100 may be configured to connect with each other via the first wireless communication channel 116A, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), Light Fidelity (Li-Fi), IEEE-802.11x, File Transfer Protocol (FTP), ZigBee, EDGE, infrared (IR), Bluetooth (BT) communication protocols, and/or variants thereof.

The second wireless communication channel 116B may include a short or a medium range communication medium through which the vehicle 106 may communicate with one or more other vehicles and/or the second communication device 112. Examples of the second wireless communication channel 116B may be similar to that of the first wireless communication channel 116A.

The wireless communication network 118 may include a long range communication medium through which the one or more vehicles, such as the vehicles 102 and 106, and the external communication devices, such as the first communication device 110 and the second communication device 112, may communicate with the server 114. Examples of the wireless communication network 118 may include, but are not limited to, the Internet, Internet based mobile ad-hoc networks (IMANET), a cellular network, such as a long-term evolution (LTE) network, a cloud network, and/or a Wide Area Network (WAN). Various devices in the network environment 100 may be configured to connect to the wireless communication network 118, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, and/or other wireless communication protocols.

The ECU 120 may comprise suitable logic, circuitry, interfaces, and/or code that may be configured to retrieve input information that includes at least a current travel route, such as the first travel route 128, to be undertaken by the vehicle 102. The ECU 120 may be configured to access sensor data from a plurality of vehicle sensors of a sensing system of the vehicle 102. The sensor data may be accessed by the ECU 120, via an in-vehicle network, such as a vehicle area network (VAN) and/or in-vehicle data bus, such as a controller area network (CAN) bus. In accordance with an embodiment, the ECU 120 may be configured to communicate with various external communication devices, such as the first communication device 110 via the first wireless communication channel 116A, and/or a cloud server, such as the server 114 via the wireless communication network 118.

The one or more display mediums 122 may comprise suitable logic, circuitry, interfaces, and/or code that may be configured to display a video or a group of related videos under the control of the ECU 120. A video may be selected by the first user 126 on an interface rendered on at least one of the one or more display mediums 122 provided in the vehicle 102. The interface may be a customized user interface (UI) configured to display the video and various types of information to occupants of the vehicle 102, such as the first user 126. In accordance with an embodiment, the one or more display mediums 122 may correspond to a front windshield, a rear windshield, and other side windows of the vehicle 102. In case of an autonomous ride, the front and rear windshield may not have a necessary requirement to be transparent or interference free visually all the time as against a manual ride (from driver's viewpoint) of a non-autonomous vehicle, such as a manual car. Thus, the front windshield, the rear windshield, and other side windows, such as left windows and right windows of the vehicle 102, may be configured to display one or more videos. The one or more display mediums 122 may be a touch screen configured to receive an input from the first user 126 from within the vehicle 102. Alternatively, in accordance with an embodiment, the interior of an autonomous vehicle, such as the vehicle 102, may be adapted such that one or more videos and various types of information may be displayed to occupants of the vehicle 102, such as the first user 126. In such a case, the interior of the vehicle, such as side, front, rear, and hood area of the vehicle 102 may be referred to as the one or more display mediums 122. For example, the interior of the vehicle, such as side, front, rear, and hood area of the vehicle 102 may be modified to act as the one or more display mediums 122, such as a projection-based display, an electro-chromic display, or a layering of a specified material that may act as a display or a projection-based display medium. The scope of the disclosure may not be limited to the one or more display mediums 122 as the front windshield, the rear windshield, and other side windows of the vehicle 102 or the modified interior of the vehicle 102. Other display mediums, for example, a heads-up display (HUD) a heads-up display with an augmented-reality system (AR-HUD), a driver information console (DIC), a projection-based display, a see-through display, and/or an electro-chromic display, may be used as the one or more display mediums 122. The AR-HUD may be a combiner-based AR-HUD. The one or more display mediums 122 may be a transparent or a semi-transparent display screen.

The video-capture units 124a to 124f may comprise suitable logic, circuitry, interfaces, and/or code that may be configured to capture one or more videos while the vehicle 102 moves along the first travel route 128. Examples of the video-capture units 124a to 124f with image sensors may include, but are not limited to, an action cam, an image sensor, a wide-angle camera, a closed-circuit television (CCTV) camera, a camcorder, a night-vision camera, a time-of-flight sensor-based camera (ToF camera), and/or other such vehicle cameras.

In accordance with an embodiment, the ECU 130, the one or more display mediums 132, the video-capture units 134a to 134f, of the vehicle 106 may be similar to that of the ECU 120, the one or more display mediums 122, the video-capture units 124a to 124f, respectively, of the vehicle 102. The ECU 130 may be configured to communicate with various external communication devices, such as the second communication device 112, such as an RSU, and/or a cloud server, such as the server 114, via the wireless communication network 118 or the second wireless communication channel 116B.

In operation, a user, such as the second user 136, may feed a destination location 138B by use of a navigation unit (not shown) of the vehicle 106. The navigation unit may calculate a route, such as the second travel route 138, from a current location 138A of the vehicle 106 to the destination location 138B to be undertaken by the vehicle 106. The vehicle 106 may be in an autonomous drive mode, a semi-autonomous mode, or a manual mode. The ECU 130 of the vehicle 106 may communicate a start command to each of the video-capture units 134a to 134f to initiate capture of a video by each of the video-capture units 134a to 134f. In accordance with an embodiment, the start command may be a broadcast command to initiate the video-capturing process at all the video-capture units 134a to 134f at the same time.

In various exemplary embodiments, the video-capture unit 134a may be installed at the front of the vehicle 106 to capture a front view outside the vehicle 106. The video-capture units 134b and 134c may be installed at the left side, for example, near the front and side windows, of the vehicle 106. Similarly, the video-capture units 134d and 134e may be installed, for example, near the front and side windows, at the right side of the vehicle 106. The left side and the right side of the vehicle 106 may be understood as per the travel direction of the vehicle 106. Alternatively, the video-capture units 134b and 134d may be installed at outside rear view mirrors (ORVMs) of the vehicle 106 to capture side views outside the vehicle 106. The video-capture unit 134f may be installed at the rear of the vehicle 106 to capture a rear view outside the vehicle 106. Alternatively, instead of multiple video cameras, as the video-capture units 134a to 134f, one or more rotatable video-capture unit may be provided that may be configured to capture a 360 degree view in the vicinity of the vehicle 106 along the second travel route 138.

The video-capture units 134a to 134f may be configured to record a time of capture of each recorded video, hereinafter referred to as a first group of related videos. The first group of related videos may be captured in an event the vehicle 106 is in motion along the second travel route 138 in the second geographical area 108. Each of the first group of related videos may correspond to different field-of-views (FOVs) of an external environment around the vehicle 106 while the vehicle 106 is in motion along the second travel route 138 in the second geographical area 108. The ECU 130 may be configured to dynamically tag the captured first group of related videos with additional information at the time of capture of the first group of related videos. The additional information may include a route shape, such as the shape of second travel route 138, a route type, such as a mountainous route, a highway, a sea-shore route, a city road, and the like. The additional information may also include a total travel time of the journey along the second travel route 138, and an average speed of the vehicle 106 at the time of capture of the first set of videos. The ECU 130 may be configured to communicate a stop command to cease or stop capture of the first group of related videos. The stop command may be automatically communicated in an event the vehicle 106 reaches its set destination.

The captured first group of related videos tagged with the additional information may be stored in a local storage unit of the vehicle 106, such as a local database in a memory of the ECU 130. In accordance with an embodiment, the first group of related videos tagged with the additional information may be communicated to the server 114, via the wireless communication network 118. Alternatively, in accordance with an embodiment, the captured first group of related videos may be communicated to the second communication device 112, such as the RSU, via the second wireless communication channel 116B. In such a case, the second communication device 112, may further communicate the captured first group of related videos to the central communication device, such as the server 114, via the wireless communication network 118. Similar to the vehicle 106, the ECU 120 of the vehicle 102 may also communicate a start and a stop command to each of the video-capture units 124a to 124f to initiate and stop capture of a video by each of the video-capture units 124a to 124f during a drive undertaken by the vehicle 102. The installation of the video-capture unit 124a to 124f may be similar to that of the video-capture unit 134a to 134f.

The video-capture units 124a to 124f may be configured to record a time of capture of each recorded videos, hereinafter referred to as a second group of related videos. The second group of related videos may be captured in an event the vehicle 102 is in motion along its current travel route in a particular geographical area, such as the first geographical area 104 or other geographical area. The ECU 120 may be configured to dynamically tag the captured second group of related videos with additional information at the time of capture of the second group of related videos. The additional information may include a route shape, such as the shape of first travel route 128, a route type, a travel time, and an average speed of the vehicle 102 at the time of capture of the second group of related videos. In accordance with an embodiment, the additional information may be tagged after the capture of the second group of related videos in the event the stop command is communicated to the video-capture units 124a to 124f. Similarly, for each ride along a set travel route, a different group of related videos may be recorded and dynamically tagged with the additional information related to the undertaken route. The second group of related videos tagged with the additional information may be stored in a local storage unit of the vehicle 102, such as a local database in a memory of the ECU 120. In accordance with an embodiment, the second group of related videos tagged with the additional information may be communicated to the server 114, via the wireless communication network 118. Alternatively, in accordance with an embodiment, the second group of related videos may be communicated to the first communication device 110, such as the RSU, via the first wireless communication channel 116A.

The server 114 may receive a plurality of tagged videos, which are tagged with the additional information from a plurality of vehicles, such as the vehicles 102 and 106. In accordance with an embodiment, the server 114 may be configured to remotely update new videos (new group of related videos) of various geographical areas, in respective storage units of the plurality of vehicles, such as the vehicles 102 and 106. The server 114 may execute the update directly or in conjunction with the RSUs, such as the first communication device 110 and/or the second communication device 112. The plurality of tagged videos that are tagged with the additional information may provide a platform to remotely generate a virtual environment in different vehicles, such as the vehicles 102 and 106, as described in FIGS. 2, 3A to 3F, 4A to 4D, 5A, and 5B.

Figure 2:
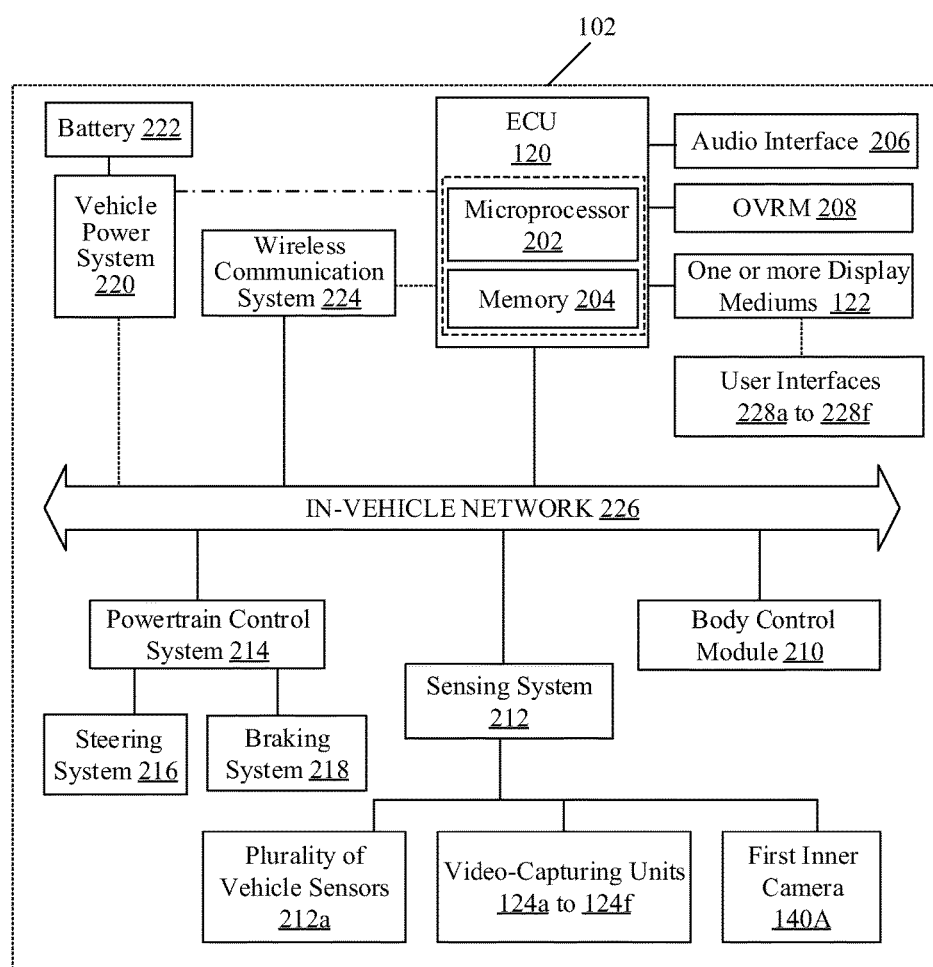
FIG. 2 is a block diagram that illustrates various exemplary components or systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIG. 1. With reference to FIG. 2, there is shown the vehicle 102. The vehicle 102 may comprise the ECU 120 that may include a microprocessor 202 and a memory 204. The vehicle 102 may further comprise an audio interface 206, an outside rear view mirror (ORVM) 208, and the one or more display mediums 122 communicatively coupled to the ECU 120. The vehicle 102 may further comprise a body control module 210, a sensing system 212, and a powertrain control system 214. The sensing system 212 may include a plurality of vehicle sensors 212a, the video-capture units 124a to 124f, and the first inner camera 140A (FIG. 1). The powertrain control system 214 may include a steering system 216 and a braking system 218. The vehicle 102 may further comprise a vehicle power system 220, a battery 222, a wireless communication system 224, and an in-vehicle network 226. The one or more display mediums 122 may be associated with one or more interfaces, such as user interfaces (UIs) 228a to 228f.

The various components or systems may be communicatively coupled via the in-vehicle network 226, such as a vehicle area network (VAN), and/or an in-vehicle data bus. The microprocessor 202 may be communicatively coupled to the audio interface 206, the one or more display mediums 122, the sensing system 212, and the wireless communication system 224. The microprocessor 202 may also be operatively connected with the body control module 210, the powertrain control system 214, the steering system 216, and the braking system 218. The wireless communication system 224 may be configured to communicate with one or more external devices, such as the first communication device 110 and the server 114 under the control of the microprocessor 202. A person of ordinary skill in the art will understand that the vehicle 102 may also include other suitable components or systems, in addition to the components or systems which are illustrated herein to describe and explain the function and operation of the present disclosure.

The microprocessor 202 may comprise suitable logic, circuitry, interfaces, and/or code that may be configured to execute a set of instructions stored in the memory 204. The microprocessor 202 may be configured to receive an input that corresponds to a selection of a video to be displayed on the one or more display mediums 122 of the vehicle 102. In accordance with an embodiment, the microprocessor 202 may be configured to automatically control one or more components or systems, such as the powertrain control system 214, the steering system 216, the braking system 218, the sensing system 212, and/or the body control module 210 of the vehicle 102, when the vehicle 102 is in an autonomous operating mode. Examples of the microprocessor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 204 may comprise suitable logic, circuitry, and/or interfaces that may be configured to store a machine code and/or a set of instructions with at least one code section executable by the microprocessor 202. The memory 204 may store a local database that may include a plurality of tagged videos that are tagged with additional information, and/or other data. The plurality of tagged videos may be associated with a plurality of route shapes included in the tagged additional information. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The audio interface 206 may be connected to a speaker, a chime, a buzzer, or other device that may be configured to generate a sound. The audio interface 206 may also be connected to a microphone or other device to receive a voice input from an occupant, such as the first user 126, of the vehicle 102. The audio interface 206 may also be communicatively coupled to the microprocessor 202. The audio interface 206 may be a part of an in-vehicle infotainment (IVI) system or head unit of the vehicle 102. In accordance with an embodiment, the one or more display mediums 122 may also be communicatively coupled to the IVI system.

The body control module 210 may refer to another electronic control unit that comprises suitable logic, circuitry, interfaces, and/or code that may be configured to control various electronic components or systems of the vehicle 102. The body control module 210 may be configured to receive a command from the microprocessor 202. The body control module 210 may relay the command to other suitable vehicle systems or components for access control of the vehicle 102.

The sensing system 212 may comprise the plurality of vehicle sensors 212a, the video-capture units 124a to 124f, and the first inner camera 140A. The plurality of vehicle sensors 212a may include traffic condition detection sensors and weather condition detection sensors. The plurality of vehicle sensors 212a may detect current traffic condition and external weather condition during motion of the vehicle 102 along the current travelling route, such as the first travel route 128. The traffic condition detection sensors may include radio detection and ranging (RADAR) device and a laser-based object detection sensor, such as a light detection and ranging (LIDAR) device. The traffic condition detection sensors may also include a vehicle speed sensor and one or more of the video-capture units 124a to 124f, such as the video-capture unit 124a installed at the front side of the vehicle body of the vehicle 102. The weather condition detection sensors may include a temperature sensor, a humidity sensor, a light sensor, a rain detection sensor, and/or other sensors to detect external weather condition. The sensing system 212 may be operatively connected to the microprocessor 202 to provide input signals to the microprocessor 202. For example, the sensing system 212 may be used to sense or detect the sensor data by use of the plurality of vehicle sensors 212a. Other examples of the plurality of vehicle sensors 212a, may include, but are not limited to a yaw rate sensor, a vehicle speed sensor, odometric sensors, a steering angle sensor, a vehicle travel direction detection sensor, a magnetometer, an image sensor, a touch sensor, an infrared sensor, a ToF sensor, a depth sensor, and a navigation unit that includes a global positioning system (GPS).

The powertrain control system 214 may refer to an onboard computer of the vehicle 102 that controls operations of an engine and a transmission system of the vehicle 102. The powertrain control system 214 may control ignition, fuel injection, emission systems, and/or operations of a transmission system (when provided) and the braking system 218.

The steering system 216 may be configured to receive one or more commands from the microprocessor 202. The steering system 216 may include a steering wheel and/or an electric motor (provided for a power-assisted steering) that may be used by the first user 126 to control movement of the vehicle 102 in a semi-autonomous mode. In accordance with an embodiment, the movement or steering of the vehicle 102 may be automatically controlled when the vehicle 102 is in autonomous mode. Examples of the steering system 216 may include, but are not limited to, an autonomous steering control, a power-assisted steering system, a vacuum/hydraulic-based steering system, an electro-hydraulic power-assisted system (EHPAS), or a "steer-by-wire" system, or an autonomous steering system, known in the art.

The braking system 218 may be used to stop or slow down the vehicle 102 by application of frictional forces. The braking system 218 may be configured to receive a command from the powertrain control system 214 under the control of the microprocessor 202, when the vehicle 102 is in an autonomous mode or a semi-autonomous mode. In accordance with an embodiment, the braking system 218 may be configured to receive a command from the body control module 210 and/or the microprocessor 202 when the microprocessor 202 preemptively detects a steep curvature based on the set current travel route of the vehicle 102, an obstacle, or other road hazards.

The vehicle power system 220 may regulate the charging and the power output of the battery 222 to various electric circuits and the loads of the vehicle 102, as described above. When the vehicle 102 is a hybrid vehicle or an autonomous vehicle, the vehicle power system 220 may provide the required voltage for all of the components and enable the vehicle 102 to utilize the battery 222 power for a sufficient amount of time. In accordance with an embodiment, the vehicle power system 220 may correspond to power electronics, and may include a microcontroller that may be communicatively coupled (shown by dotted lines) to the in-vehicle network 226. In such an embodiment, the microcontroller may receive command from the powertrain control system 214 under the control of the microprocessor 202.

The battery 222 may be a source of electric power for one or more electric circuits or loads (not shown). For example, the loads may include, but are not limited to various lights, such as headlights and interior cabin lights, electrically powered adjustable components, such as vehicle seats, mirrors, windows or the like, and/or other in-vehicle infotainment system and/or accessories, such as radio, speakers, electronic navigation system, electrically controlled, powered and/or assisted steering, such as the steering system 216. The battery 222 may be a rechargeable battery. The battery 222 may be a source of electrical power to the ECU 120 (shown by dashed lines), the plurality of vehicle sensors 212a, the video-capture units 124a to 124f, and the first inner camera 140A of the sensing system 212, and/or other hardware units, such as the one or more display mediums 122. The battery 222 may be a source of electrical power to start an engine of the vehicle 102 by selectively providing electric power to an ignition system (not shown) of the vehicle 102.

The wireless communication system 224 may comprise suitable logic, circuitry, interfaces, and/or code that may be configured to communicate with one or more external devices, such as the first communication device 110 via the first wireless communication channel 116A, and one or more cloud servers, such as the server 114, via the wireless communication network 118. The wireless communication system 224 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card. The wireless communication system 224 may wirelessly communicate by use of various communication protocols of the first wireless communication channel 116A and the wireless communication network 118 (as described in FIG. 1).

The in-vehicle network 226 may include a medium through which the various control units, components, and/or systems of the vehicle 102, such as the ECU 120, body control module 210, the sensing system 212, the powertrain control system 214, the wireless communication system 224, the audio interface 206, and the one or more display mediums 122, may communicate with each other. In accordance with an embodiment, in-vehicle communication of audio/video data for multimedia components may occur by use of Media Oriented Systems Transport (MOST) multimedia network protocol of the in-vehicle network 226 or other suitable networks for audio/video data communication. The MOST-based network may be a separate network from the controller area network (CAN). The MOST-based network may use a plastic optical fiber (POF). In accordance with an embodiment, the MOST-based network, the CAN, and other in-vehicle networks may co-exist in a vehicle, such as the vehicle 102. The in-vehicle network 226 may facilitate access control and/or communication between the microprocessor 202 (and the ECU 120) and other ECUs, such as a telematics control unit (TCU) of the vehicle 102. Various devices or components in the vehicle 102 may be configured to connect to the in-vehicle network 226, in accordance with various wired and wireless communication protocols. Examples of the wired and wireless communication protocols for the in-vehicle network 226 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I²C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The one or more UIs, such as the UIs 228a to 228f, may be rendered on the one or more display mediums 122, under the control of the microprocessor 202. The display of the refined set of videos for user-selection, the augmented-reality view, and other generated views in different display modes (as described in FIGS. 4A to 4D) to generate the virtual environment in the vehicle 102, may occur by use of the one or more UIs 228a to 228f. The UIs 228a to 228f may be configured in accordance to the one or more display mediums 122, for example, as shown for UIs 228a to 228c in FIGS. 3D, 3F, and 4A to 4D.

In operation, a commuter, such as the first user 126, may want to drive the vehicle 102 in an autonomous drive mode. The first user 126 may be prompted, by a navigation unit of the sensing system 212 of the vehicle 102, to feed the destination location 128B in the autonomous drive mode. In instances when the vehicle 102 is an autonomous vehicle, the first user 126 may be required to mandatorily provide the destination location 128B at the start of a journey, for example, to begin a journey along the first travel route 128 in the first geographical area 104. In instances when the vehicle 102 is a semi-autonomous vehicle, the first user 126 may be required to provide the destination location 128B in an event the first user 126 switches control to the autonomous drive mode from the current manual mode by use of an input/output (I/O) unit, such as the IVI system, of the vehicle 102.

The navigation unit of the sensing system 212 may calculate a route, such as the first travel route 128, from a current location, such as the start location 128A, of the vehicle 102 to the destination location 128B to be undertaken by the vehicle 102. The first user 126 inside the vehicle 102 may desire to experience a virtual environment in the vehicle 102. The first user 126 may touch a display medium, for example, the left rear window of the vehicle 102, of the one or more display mediums 122. The microprocessor 202 of the ECU 120 may be configured to render an interface, such as the UI 228a, on the display medium, based on the touch input. Alternatively, other than the touch input a voice input or a gesture input may also be provided to render the interface. The interface, such as the UI 228a, may be rendered with a user prompt. The user prompt may correspond to display of informational messages, such as a weather condition outside the vehicle 102, and/or prompt the first user 126 for input, such as "Do you want a virtual environment?", to seek a confirmation or response, such as a "YES" or "NO" confirmation, from the first user 126. In an event the first user 126 provides a "YES" confirmation, the microprocessor 202 may be configured to retrieve input information from the in-vehicle network 226 of the vehicle 102. The input information may include the current travel route (such as the first travel route 128 set by use of the navigation unit) to be undertaken by the vehicle 102.

Figure 3B:
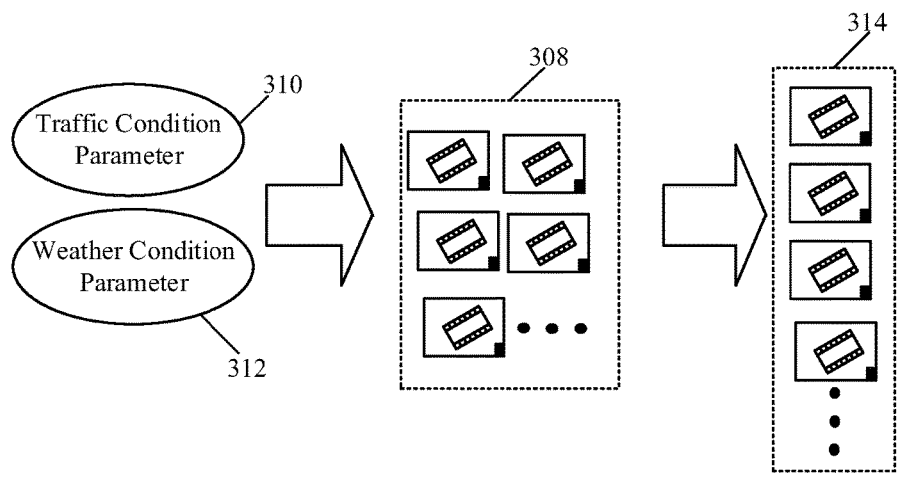
Figure 3C:
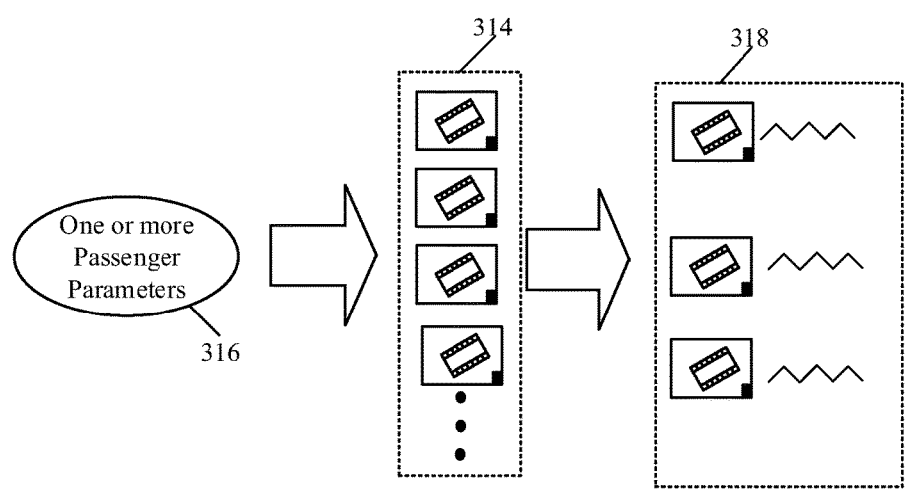
Figure 3D:
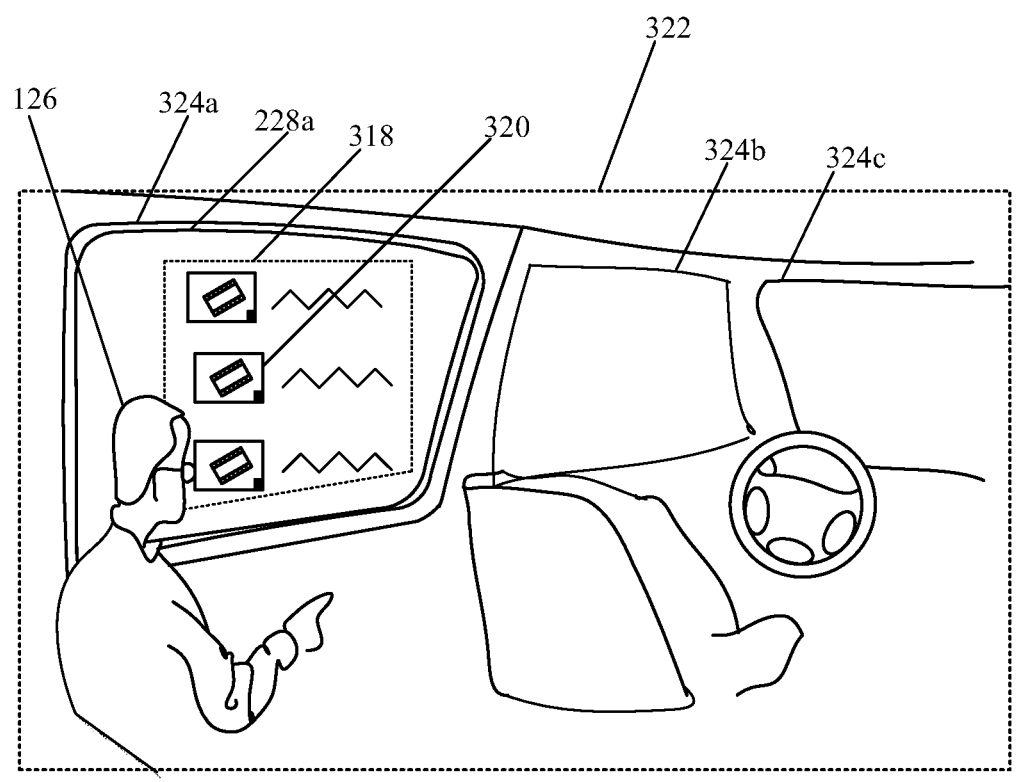
Figure 3E:
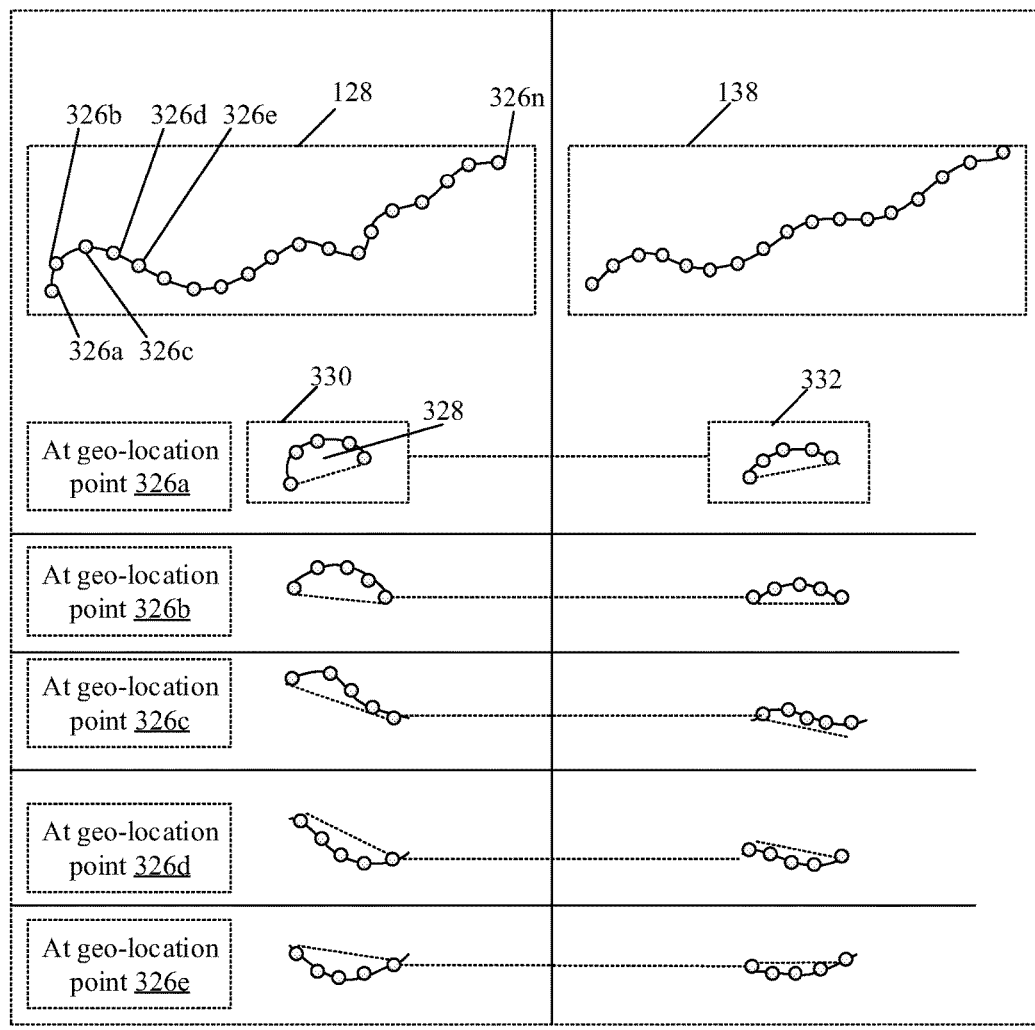
Figure 3F:
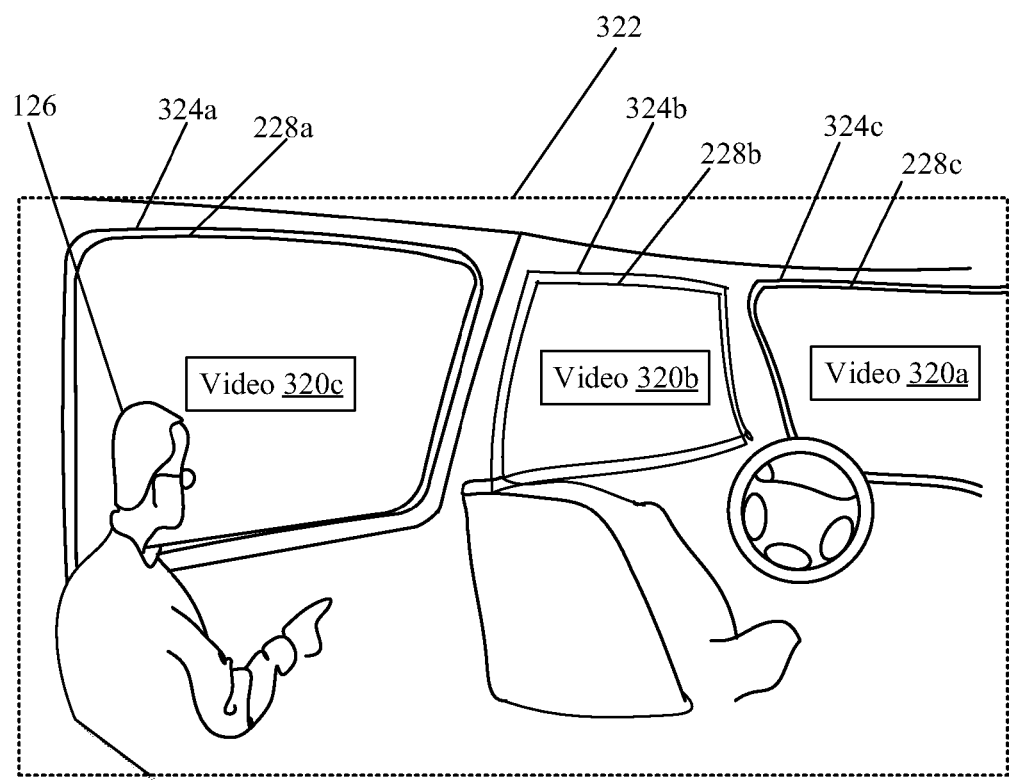

FIGS. 3A to 3F illustrate various operations of the disclosed display control system and method to generate a virtual environment in a vehicle, in accordance with an embodiment of the disclosure. FIGS. 3A 3F are explained in conjunction with elements from FIGS. 1 and 2. With reference to FIG. 3A, there is shown a first criteria, such as search parameters 302, a plurality of tagged videos 304, tagged information 306, a first set of videos 308, and the memory 204. The search parameters 302 may include a route shape 302a, a total travel time 302b, an average speed 302c, and a route type 302d of the current travel route, such as the first travel route 128, of the vehicle 102. The tagged information 306 may include a route shape 306a, a total travel time 306b, an average speed 306c, and a route type 306d, associated with each of the plurality of tagged videos 304. The plurality of tagged videos 304 with the tagged information 306 may correspond to the plurality of tagged videos that were tagged the additional information recorded previously by the video-capture units 124a to 124f, of the vehicle 102 or the plurality of tagged videos of different geographical areas received from the server 114 (as described in FIG. 1). Each of the plurality of tagged videos 304 may be associated with the additional information, such as the route shape 306*a*, the total travel time 306*b*, the average speed 306*c*, and/or the route type 306*d*, of a plurality of travel routes previously undertaken by the vehicle 102 or other vehicles, such as the vehicle 106. In some embodiments, the tagged information 306 may include a traffic condition parameter and a weather condition parameter (not shown) and the each of the plurality of tagged videos 304 may be associated with the additional information of the traffic condition parameter and the weather condition parameter.

In accordance with an embodiment, the microprocessor 202 of the ECU 120 may be configured to determine the route shape 302*a* and a total number of curvatures in the current travel route, such as the first travel route 128, of the vehicle 102, based on the current travel route, such as the first travel route 128, in the retrieved input information. The microprocessor 202 may be configured to utilize the retrieved input information as one or more search parameters, such as the search parameters 302, to execute a similarity search against the tagged information 306 of the plurality of tagged videos 304 pre-stored in the memory 204 and/or the server 114.

The microprocessor 202 of the ECU 120 may be configured to compare at least the route shape 302*a* of the current travel route, such as the first travel route 128, to a plurality of route shapes associated with the plurality of tagged videos 304. The microprocessor 202 may be configured to retrieve the first set of videos 308 from among the plurality of tagged videos 304 from the memory 204, based on the route shape comparison. The comparison of the route shape may be executed by the microprocessor 202 by extraction of shape features and by use of one or more contour/shape comparison algorithms.

The microprocessor 202 may be configured to find one or more similar shaped travel routes (similar to shape of the current travel route of the vehicle 102) by shape feature extraction and classification. In accordance with an embodiment, the shape features may be extracted for the route shape of the current travel route and the route shape of all the available travel routes associated with the plurality of tagged videos 304 in the memory 204. The shape features may be represented by different parameters, such as a center of gravity, an axis of least inertia (ALI), an area, digital bending energy, eccentricity, a circularity ratio, an elliptic variance, a rectangularity, a convexity, a solidity, an Euler number, a contour curvature, a centroid distance, a chord length, a tangent angle, or the like. The center of gravity may also be referred to a centroid or a centroid of a contour used for geometric shape determination. Similarly, ALI may denote one or more imaginary lines shaped as "L" within a curvature that minimizes a distance from it (the "L" line) to the boundary shape of the curvature. The digital bending energy uses an arc-length to denote a shape of a curvature. Eccentricity refers to an aspect ratio, such as a ratio of length of a two axis (such as a major and a minor axis) to represent a shape. The circularity ratio represents a ratio that defines a shape of a curvature in terms of how similar is the shape of a curvature to a circle. The elliptic variance may refer to use of a mapping error of a shape of a curvature to fit an ellipse. The rectangularity defines a shape of a curvature in terms of how similar is the shape of a curvature to a rectangle. The rectangularity may be ratio of an area of a shape of a curvature to an area of a minimum bounding rectangle. Similarly, convexity may refer to a ratio of perimeters of a convex hull to an original contour. The solidity refers to an extent/degree to which a shape is convex or concave. For example, Moving Picture Experts Group 7 (MPEG-7) shape descriptors, may be used for the extraction of the shape features for the route shape comparison. A person having ordinary skill in the art will understand that the scope of the disclosure is not limited the shape feature extraction for comparison of the route shape by use of the MPEG-7 shape descriptors. The route shape comparison may be executed by use other algorithms or shape descriptors, such as other global and local shape descriptors known in art, without limiting the scope of the disclosure. The extracted features may then be used to classify and find similar matching shapes from the plurality of route shapes associated with the plurality of tagged videos 304.

In accordance with an embodiment, the microprocessor 202 may be configured to retrieve one or more videos of the first set of videos 308 from an external communication device, such as the server 114. The first set of videos 308 may include videos, in which the route shape 306*a* associated with each video may be same or similar to the route shape 302*a* of the current travel route, such as the first travel route 128, of the vehicle 102.

In accordance with an embodiment, the microprocessor 202 may be configured to utilize additional search parameters, such as the total travel time 302*b*, the average speed 302*c*, and/or the route type 302*d*, of the vehicle 102, for the retrieval of the first set of videos 308. The additional search parameters may be directly compared against the tagged information 306, such as the total travel time 306*b*, the average speed 306*c*, and/or the route type 306*d*, of the plurality of tagged videos 304. The comparison may be executed by the microprocessor 202 for the retrieval of the first set of videos 308.

With reference to FIG. 3B, there is shown a second criteria, such as a traffic condition parameter 310 and a weather condition parameter 312, to filter the first set of videos 308. A first refined set of videos 314 may be obtained based on the filtering of the first set of videos 308, as shown. FIG. 3B is explained in conjunction with elements from FIGS. 1, 2, and 3A.

In accordance with an embodiment, the microprocessor 202 may be configured to filter the retrieved first set of videos 308 based on one or more criteria, such as the second criteria, to obtain the first refined set of videos 314. The second criteria, which includes the traffic condition parameter 310 and the weather condition parameter 312, may correspond to the sensor data extracted from the in-vehicle network 226 of the vehicle 102. The sensor data may be extracted during motion of the vehicle 102 along the current travel route, such as the first travel route 128. The sensor data may refer to the various cues related to a traffic condition and a weather condition as detected by the plurality of vehicle sensors 212*a* provided in the vehicle 102 in motion along the first travel route 128. For example, the traffic condition may be a traffic congestion level as detected by the RADAR, LIDAR, and/or the video-capture unit 124*a* located at front side of the vehicle 102. The detected traffic congestion level may be utilized as the traffic condition parameter 310 to find a relevant video in the first set of videos 308 with similar traffic congestion level. Similarly, detected weather condition, such as current temperature and humidity at the vehicle 102, may be utilized, as the weather condition parameter 312 to find a relevant video in the first set of videos 308 with similar weather condition, based on the tagged information 306, such as the route shape 306*a*, the total travel time 306*b*, the average speed 306*c*, the route type 306*d*, the traffic condition parameter and the weather condition parameter associated with each videos.

With reference to FIG. 3C, there is shown a third criteria, such as one or more passenger parameters 316, to further filter the first refined set of videos 314, to obtain a second refined set of videos 318. FIG. 3C is explained in conjunction with elements from FIGS. 1, 2, 3A, and 3B. The one or more passenger parameters 316 may include an age, a gender, a user-preference, number of passengers, and/or a relationship among passengers. In accordance with an embodiment, the one or more passenger parameters 316, such as the age, the gender, and the number of passengers, may be estimated by use of the first inner camera 140A of the vehicle 102. One or more face detection and/or human object detection and identification algorithms may be applied on an image captured by the first inner camera 140A for the estimation of age, gender, and the number of passengers, of the one or more passenger parameters 316. In accordance with an embodiment, the one or more passenger parameters 316 may be pre-configured by the first user 126, via one of the UIs 228a to 228f.

In accordance with an embodiment, the microprocessor may be configured to assign a priority to the different criteria, such as the first criteria, the second criteria and the third criteria, based on a priority setting defined by the first user 126. For example, a first, a second, and a third priority may be assigned to the first criteria, the second criteria and the third criteria, respectively, for search and relevant video retrieval purpose. Alternatively, at least one of the first criteria, such as the route shape 302a, to retrieve the first set of videos 308 may be set as a first priority by default. The additional search parameters of the first criteria, such as the total travel time 302b, the average speed 302c, and/or the route type 302d, of the vehicle 102, may be assigned priority based on the number of results retrieved in the first set of videos 308. For example, in an event the number of results retrieved is greater than a first threshold numeric value, such as above 1000 tagged videos, the additional search parameters of the first criteria may be applied to reduce the count to a defined acceptance limit, such as near the first threshold numeric value. Thereafter, the parameters of the second criteria and the third criteria, may be applied to retrieve certain number of relevant tagged videos within a defined display limit, such as top ten relevant tagged videos. The first user 126 may opt in or opt out certain parameters or change priority settings, for search and comparison, via the UI 228a, as per choice.

The microprocessor 202 may be configured to display a refined set of videos, such as the first refined set of videos 314 and/or second refined set of videos 318, based on the filtration of the first set of videos 308. In accordance with an embodiment, the final set of refined videos, such as the second refined set of videos 318, may be displayed on one of the interfaces, such as the UI 228a. The interface, such as the UI 228a, may be rendered on at least one display medium of the one or more display mediums 122.

With reference to FIG. 3D, there is shown an interior portion 322 of the vehicle 102 to depict the interface, such as the UI 228a, rendered on at least one display medium, such as a left rear window 324a, of the one or more display mediums 122. FIG. 3D is explained in conjunction with elements from FIGS. 1, 2, and 3A to 3C. A list of refined set of videos, such as the second refined set of videos 318, may be displayed on the UI 228a. The second refined set of videos 318 may be displayed as icons with additional details, such as a title of video, a date of capture of the video by the vehicle 102 or by other vehicle, such as the vehicle 106, a geo-location of the captured video, a climatic condition at the time of capture of the video, and a preset frame rate, such as 29 frames/second. The first user 126 seated inside the vehicle 102 in motion may want to experience traveling in a different route or a different environment. For example, the vehicle 102 in motion in the first geographical area 104, such as a "New York" city, along the current travel route, such as the first travel route 128, may want to experience as if traveling in a "Tokyo" city (a different geographical area). The first user 126 may provide an input to select one of the refined set of videos, such as the second refined set of videos 318, displayed on the interface, such as the UI 228a. Alternatively stated, the microprocessor 202 may be configured to receive the input that corresponds to the selection of a video (referred to as selected video 320), from the displayed list of second refined set of videos 318. The selected video 320 may be a video or a group of related videos tagged with additional information (such as the first set of related videos), captured previously from some other vehicles, such as the vehicle 106, while the other vehicle, such as the vehicle 106, moved along its travel route, such as the second travel route 138, in the second geographical area 108, such as the "Tokyo" city. The microprocessor 202 may be configured to determine a relevance factor between the current travel route, such as the first travel route 128, of the vehicle 102 and a travel route, such as the second travel route 138, associated with the selected video 320. The relevance factor may be determined while the vehicle 102 is in motion along the current travel route.

FIG. 3E illustrates determination of a relevance factor between the current travel route, such as the first travel route 128, of the vehicle 102 and a travel route, such as the second travel route 138, associated with the selected video 320. FIG. 3E is explained in conjunction with elements from FIGS. 1, 2, and 3A to 3D. With reference to FIG. 3E, there is shown a plurality of geo-location points 326a to 326n along the current travel route, such as the first travel route 128, of the vehicle 102 and a travel route, such as the second travel route 138, associated with the selected video 320. The plurality of geo-location points 326a to 326n may refer to GPS coordinates of the current travel route, such as the first travel route 128. There is shown a portion 330 of the current travel route (such as the first travel route 128) of the vehicle 102 and another portion 332 of the travel route (such as the second travel route 138) associated with the selected video 320. In the plurality of geo-location points 326a to 326n, geo-location point 326n may refer to last "N" geo-location point.

In accordance with an embodiment, the relevance factor may be determined by the microprocessor 202, based on a curvature parameter between the current travel route, such as the first travel route 128, and the travel route, such as the second travel route 138, associated with the selected video 320. The microprocessor 202 may be configured to compute a degree of curvature at each geo-location point of the plurality of geo-location points 326a to 326n for next "N" number of consecutive geo-location points, where "N" is a defined numeric value. The degree of curvature at each geo-location point may be computed for both the first travel route 128 and the second travel route 138 associated with the selected video 320. For example, at geo-location point 326a, a degree of curvature may be computed for next five geo-location points, such as up to the geo-location point 326f. A curve may be formed by the next "N" number of geo-location points, such as five geo-location points, on a travel route, as shown. The degree of curvature at the geo-location point 326a for the first travel route 128 may be "CK326a" and for the second travel route, 138 may be "CS326a". Similarly, at geo-location points 326b, 326c, 326d, and 326e, a degree of curvature computed by use of next five geo-location points, such as the geo-location point 326f, 326g, 326h, 326i, and 326j, respectively, as shown. The degree of curvature at the geo-location points 326b, 326c, 326d, and 326e for the first travel route 128 may be "CK326b", "CK326c", "CK326d", "CK326e", and for the second travel route 138 may be "CS326b", "CS326c", "CS326d", "CS326e", respectively. The degree of curvature may also be referred to as an amount of curvature.

The computation of the degree of curvature may be executed by the microprocessor 202 by use of one or more mathematical models or algorithms. For example, an area, such as the area 328, within the curvature may be computed by use of integration method (shown by dotted lines), which in turn may indicate the degree of the curvature. A person having ordinary skill in the art will understand that the scope of the disclosure is not limited the computation of the degree of curvature of the route shape by use of the integration method to compute the area 328 within each curvature. The computation of the degree of curvature may be executed by use other algorithms or mathematical models, which are known in art, without limiting the scope of the disclosure. The microprocessor 202 may be configured to utilize the computed degree of curvature at each geo-location point of the plurality of geo-location points 326a to 326n (until last or near Nth geo-location point 326n).

In accordance with an embodiment, at each of the plurality of geo-location points 326a, . . . , 326n-1, 326n, while the vehicle 102 is in motion, the microprocessor 202 may determine a relevance factor based on a curvature parameter between the current travel route, such as the first travel route 128, and the second travel route 138 associated with the selected video 320. The relevance factor may indicate a similarity and/or a deviation in one or more curvatures between the first travel route 128 and the second travel route 138. The relevance factor may be a ratio between a first degree of curvature of a portion, such as the portion 330, of the current travel route (such as the first travel route 128) of the vehicle 102 and a second degree of curvature of a corresponding portion, such as the portion 332, of the travel route (such as the second travel route 138) associated with the selected video 320.

An example of the relevance factor related to the curvature parameter for the geo-location points 326a to 326e, is given in the following Table 1.

TABLE 1

Relevance factors at different geo-location points for a curvature of the current travel route and a corresponding curvature of the travel route associated with the selected video.

| At Geo-location Points | Relevance factor (RC__*) | Ratio |
| --- | --- | --- |
| 326a | RC__326a | CK326a/CS326a |
| 326b | RC__326b | CK326b/CS326b |
| 326c | RC__326c | CK326c/CS326c |
| 326d | RC__326d | CK326d/CS326d |
| 326e | RC__326e | CK326e/CS326e |

The microprocessor 202 of the ECU 120 may be configured to adjust one or more video parameters of the selected video 320 based on the determined relevance factor. The one or more video parameters may include a frame rate and/or brightness values. The one or more video parameters may be adjusted in an event the vehicle 102 encounters one or more curvatures along the current travel route, such as the first travel route 128. For example, in an event the vehicle 102 moves along different curvatures, such as a vertical curvature, a horizontal curvature, road intersections, and/or takes turns, such as a left, a right, or a U-turn, the one or more video parameters may be dynamically adjusted. In accordance with an embodiment, the one or more video parameters may be dynamically adjusted based on a steering angle detected by use of the steering angle sensor of the plurality of vehicle sensors 212a.

In accordance with an embodiment, the adjustment of the one or more video parameters of the selected video 320 may be executed further based on a speed factor of the vehicle 102. For example, at each of the plurality of geo-location points 326a to 326n, while the vehicle 102 is in motion, the microprocessor 202 may compute the speed factor. The speed factor may be a ratio of a current travel speed of the vehicle 102 to the speed of a vehicle at the time the selected video 320 was captured by the vehicle (such as the speed of the vehicle 106 in this case), as given by exemplary expression (1). The microprocessor 202 may be configured to control display of the selected video 320 or the group of related videos associated with the selected video on the one or more display mediums 122 in the vehicle 102 in motion. The display of the selected video 320 or the group of related videos associated with the selected video may be controlled in accordance with the adjusted one or more video parameters of the selected video 320 or the group of related videos.

$$SF = \frac{\text{Current travel speed of a vehicle at each geo-location}}{\text{Speed of a vehicle during the time of capturing of video at each geo-location}} \quad (1)$$

Where, SF=Speed factor at each geo-location.

With reference to FIG. 3F, there is shown the interior portion 322 of the vehicle 102 to depict the group of related videos, such as videos 320a to 320c, the UIs 228a to 228c, the left rear window 324a, the left front window 324b, and the front windshield 324c, of the vehicle 102. The videos 320a to 320c may be linked to the selected video 320. Each of the videos 320a to 320c may correspond to different FOVs of an external environment of same vehicle at a previous time instance or external environment of another vehicle, such as the vehicle 106 when the vehicle 106 was in motion along the second travel route 138 in the second geographical area 108.

For example, the videos 320a to 320c may correspond to the first group of related videos (FIG. 1) previously captured by the video-capture units 134a to 134f, and the selected video 320 may be one of the first group of related videos. The video 320a that includes the front view outside the vehicle 106 captured previously by the video-capture unit 134a, may be displayed on the UI 228c rendered on the front windshield 324c. Similarly, the video 320b that includes the left side view outside the vehicle 106 captured previously by the video-capture unit 134b, may be displayed on the UI 228b rendered on the left front window 324b. The video 320c that includes the left side view outside the vehicle 106 captured previously by the video-capture unit 134c, may be displayed on the UI 228a rendered on the left rear window 324a, as shown. The left side and the right side of the vehicle 102 may be understood as per the travel direction of the vehicle 102. Thus, a virtual environment of the second geographical area 108, such as "Tokyo" city, may be created in the vehicle 102, which may travel in the first geographical area 104, such as the "New York" city. A desired virtual environment is created in the vehicle 102 based on the selection of a video, such as the selected video 320, from the second refined set of videos 318, by the first user 126. For the sake of brevity, three display mediums, such as the left rear window 324a, the left front window 324b, and the front windshield 324c, of the vehicle 102, three UIs 228a to 228c, and three videos, such as the videos 320a to 320c, of the group of related videos, are shown. However, it is to be understood that other display mediums, such as a right rear window, a right front window, and a rear windshield, may be provided in the vehicle 102, where the UIs 228d to 228f, may be rendered. Further, other videos of the group of related videos may be displayed on the UIs 228d to 228f, and the display control may occur similar to the display control of the videos 320a to 320c.

In accordance with an embodiment, the microprocessor 202 may be configured to constantly and dynamically adjust the frame rate of the videos 320a to 320c during display on the one or more display mediums 122, such as the left rear window 324a, the left front window 324b, and the front windshield 324c, of the vehicle 102. In an event the vehicle 102 moves along a steep curvature along the first travel route 128 or a degree of curvature of the first travel route 128 is different from the corresponding degree of curvature of the travel route associated with the selected video 320, the frame rate of the videos 320a to 320c may be increased. For example, the frame rate of the videos 320a to 320c may be increased from 29 frames/second to 100 frames/second at the time of passing the curvature along the first travel route 128 based on the determined relevance factor, to provide and constantly maintain a realistic experience of virtual environment in the vehicle 102. The adjustment of the frame rate may be executed by the microprocessor 202 based on the determined relevance factor, for a plurality of geo-location points associated with the curvature portion, such as the portion 330 (FIG. 3E). In accordance with an embodiment, the adjustment of the one or more video parameters, such as the frame rate, may be done based on both the determined relevance factor and the speed factor. For each of the plurality of geo-location points 326a to 326n, the adjusted frame rate may be determined as given by the expression (2).

$$AFR = (\text{Current frame rate} \times \text{Determined relevance factor} \times \text{Speed factor}) \quad (2),$$

where AFR=Adjusted frame rate.

In accordance with an embodiment, a first weight factor may be assigned to the determined relevance factor and a second weight factor may be assigned to the speed factor. A high relevance between a curvature of the first travel route 128 and the second travel route 138, indicate a highly similar curvature between the first travel route 128 and the second travel route 138. In such a case, the first weight factor may be set smaller as compared to the second weight factor so that the adjustment of the one or more video parameters, such as the frame rate, is primarily based on the speed factor. Similarly, a low relevance between a curvature of the first travel route 128 and the second travel route 138, may indicate a highly dissimilar curvature between the first travel route 128 and the second travel route 138. In such a case, the first weight factor may be set greater as compared to the second weight factor so that the adjustment of the one or more video parameters, such as the frame rate, is primarily based on the relevance factor. One or more similarity thresholds may be defined to compute the high and low relevance related to curvature and vice-versa.

In accordance with an embodiment, the microprocessor 202 may be configured to further adjust brightness values or audio volume of one or more video segments of the videos 320a to 320c during display on the one or more display mediums 122, such as the left rear window 324a, the left front window 324b, and the front windshield 324c, in the vehicle 102 in motion. The brightness values of the one or more video segments of the videos 320a to 320c displayed on the left rear window 324a, the left front window 324b, and the front windshield 324c, may be different for different time-of-day or external light conditions. For example, if the vehicle 102 travels along the first travel route 128 during late evening or night time, the brightness values of the displayed one or more video segments of the videos 320a to 320c, may be increased. The brightness adjustment may depend on specified users' preferences.

In accordance with an embodiment, the group of related videos, such as videos 320a to 320c, may be displayed on a same display medium, such as the front windshield 324c, instead of display at different display mediums, as described above. Such display may occur based on a user preference set via one of the UIs 228a to 228f. In accordance with an embodiment, it may be raining outside the vehicle 102, and the first user 126, may want to create a virtual environment of the same route or a similar route with a climatic condition of a sunny day. Thus, the search and retrieval of the first set of videos 308, or filtering of the first set of videos 308 (as described in FIG. 3A to 3C), may occur based on a user preference, such as "sunny day", provided by an in-vehicle user, such as the first user 126, via one of the UIs, such as the UI 228a. In accordance with an embodiment, the different criteria, such as the first criteria, the second criteria, and the third criteria, and the search parameters, may be fed into the ECU 120, via at least one of the UIs 228a to 228f. The ECU 120 may then retrieve the refined set of videos of same or similar route shape of the current travel route of the vehicle 102. The retrieved videos presented to the first user 126 may be of "sunny" day climatic condition to enable creation of a virtual environment of "sunny" day inside the vehicle 102.

In accordance with an embodiment, the one or more display mediums 122 in the vehicle 102 are arranged such that a natural view of an external environment of the vehicle 102 is selectively restricted to one or more passengers from within the vehicle 102. The natural view of the external environment may be restricted during the display of the videos 320a to 320c (linked to the selected video 320) on the one or more display mediums 122 in the vehicle 102 in motion. The natural view may refer to an actual view of outside environment, such as a street, buildings, or an outside area, from a viewpoint of an in-vehicle user, such as the first user 126, from inside the vehicle 102.

In accordance with an embodiment, a display mode from a plurality of defined display modes may be selected to generate different types of virtual environment. The plurality of defined display modes may include a virtual video mode, an overlapped view mode, an augmented-reality view mode, and an actual outside video mode. The microprocessor 202 may allow selection of one of the plurality of defined display modes based on a touch input, a voice input, or a gesture input. The touch input for the mode selection may be provided on one of the UIs 228a to 228f.

Figure 4A:
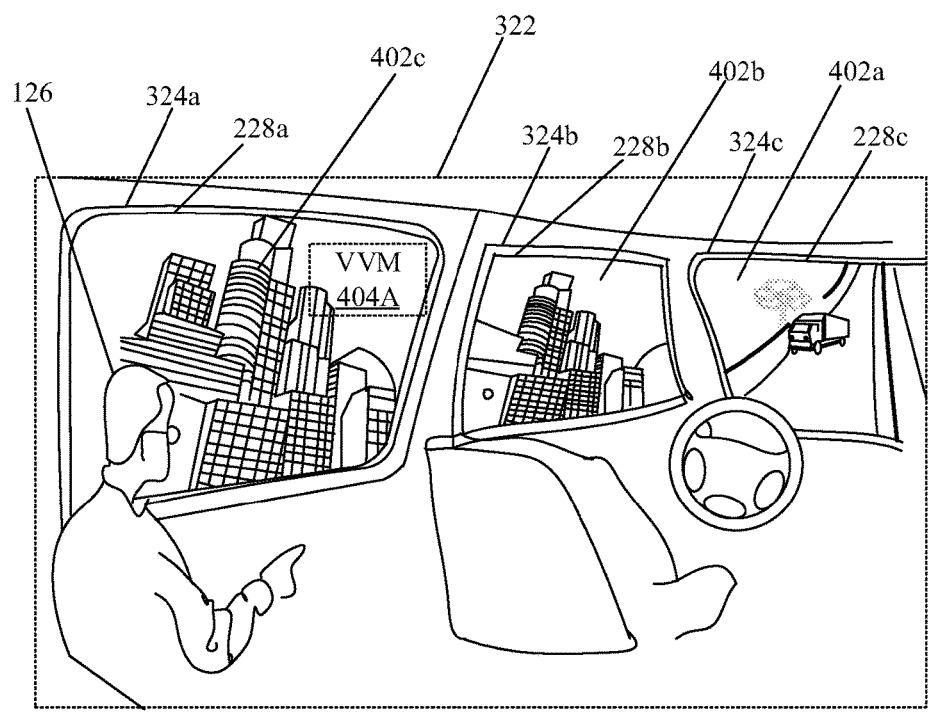
FIG. 4A to 4D illustrate exemplary scenarios for implementation of the disclosed display control system and method in various modes to generate a virtual environment in a vehicle, in accordance with an embodiment of the disclosure.

FIG. 4A to 4D illustrate exemplary scenarios for implementation of the disclosed display control system and method in various modes to generate a virtual environment in a vehicle, in accordance with an embodiment of the disclosure. With reference to FIG. 4A, there is shown the interior portion 322 of the vehicle 102 to depict the group of related videos, such as a first video 402*a*, a second video 402*b*, and a third video 402*c*, displayed in a virtual video mode (VVM) 404A.

In accordance with an exemplary scenario, the group of related videos, such as the first video 402*a*, the second video 402*b*, and the third video 402*c*, may correspond to the first group of related videos (FIG. 1). The group of related videos, such as the first video 402*a*, the second video 402*b*, and the third video 402*c*, may be displayed based on a selection of one of the refined set of videos, such as the second refined set of videos 318 (FIG. 3C).

The VVM 404A may be a default mode to display the selected video or the group of related videos (which also include the selected video) on a plurality of display mediums (such as the one or more display mediums 122) in the vehicle 102. The group of related videos, such as the first video 402*a*, the second video 402*b*, and the third video 402*c*, may be displayed in an event the vehicle 102 is in motion along the current travel route, such as the first travel route 128, in the first geographical area 104. The display of the group of related videos on the plurality of display mediums may be controlled such that a virtual environment of the second geographical area 108 related to the travel route (such as the second travel route 138) of the selected video is created within the vehicle 102.

In this scenario, for example, the vehicle 102 may actually travel along a road portion of the first travel route 128 of "New York" city (such as the first geographical area 104), where a view around a road portion of the second travel route 138 of the "Tokyo" city (a different geographical area) may be displayed. The first video 402*a* that corresponds to the front view of the road portion of the "Tokyo" city, is shown displayed on the UI 228*c* rendered on the front windshield 324*c*. The second video 402*b* and the third video 402*c* that corresponds to a left side view of the road portion of the "Tokyo" city, may be displayed on the UI 228*b* rendered on the left front window 324*b*, and UI 228*a* rendered on the left rear window 324*a*, as shown. The one or more video parameters of the first video 402*a*, the second video 402*b*, and the third video 402*c* may be adjusted in real time or near-real time as the vehicle 102 moves along the first travel route 128. The adjustment of the one or more video parameters may be executed based on the determined relevance factor and/or the speed factor, as discussed in the FIGS. 3E and 3F.

In accordance with an embodiment, the volume of the displayed first video 402*a*, the second video 402*b*, and the third video 402*c*, may be adjusted based on external traffic noise around the vehicle 102. The adjustment of the volume may be further based on user's preference in emergency conditions. For example, in an event the external traffic noise is greater than a defined threshold noise, the volume of an audio associated with the displayed first video 402*a*, the second video 402*b*, and the third video 402*c*, may be increased. Similarly, in an event the external traffic noise is less than a defined threshold noise, the volume of an audio played currently with the displayed first video 402*a*, the second video 402*b*, and the third video 402*c*, may be decreased. In accordance with an embodiment, a single audio may be associated with the group of related videos, such as the first video 402*a*, the second video 402*b*, and the third video 402*c*. The audio may be captured concurrently at the time of capture of the first video 402*a*, the second video 402*b*, and the third video 402*c*, in the second geographical area 108. Further, alternatively in accordance with an embodiment, the audio associated with the displayed first video 402*a*, the second video 402*b*, and the third video 402*c*, may be substituted with an audio of the outside environment of the vehicle 102 captured by a microphone of the sensing system 212. The microprocessor 202 may communicate an audio substitute command to the audio interface 206 during an emergency situation, for example, when a patrol vehicle siren is detected in the vicinity of the vehicle 102 or in other emergency conditions. In accordance with an embodiment, the microprocessor 202 may be configured to automatically pause and resume display of the first video 402*a*, the second video 402*b*, and the third video 402*c*, based on halt and resume of the drive along the first travel route 128 of the vehicle 102 or based on emergency conditions.

Figure 4B:
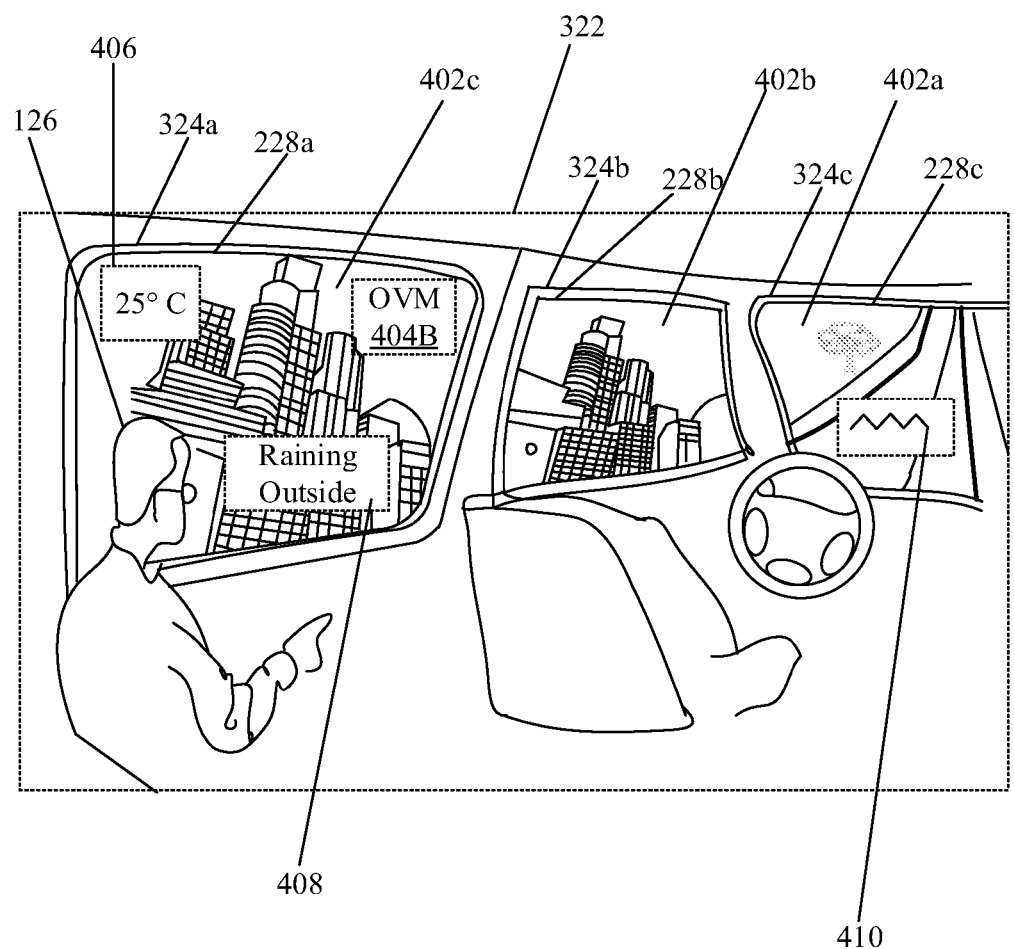

With reference to FIG. 4B, there is shown the interior portion 322 of the vehicle 102 to depict a group of related videos, such as the first video 402*a*, the second video 402*b*, and the third video 402*c*, displayed in an overlapped view mode (OVM) 404B. In an event the OVM 404B is selected, informative text messages related to a current external environment along the current travel route, such as the first travel route 128, may be displayed over at least one of the group of related videos, such as the first video 402*a*, as shown. In this scenario, for example, a current outside temperature 406, such as 25 degrees C., a climatic condition 408, such as "raining outside", or a current traffic condition 410, such as "heavy traffic outside", may be overlaid on defined areas of one or more interfaces, such as the UI 228*a* to 228*c*, as shown. In the OVM 404B, the traffic condition and the weather condition detected by the plurality of vehicle sensors 212*a* provided in the vehicle 102 during motion of the vehicle 102 along the current travelling route, may be used. The sensor data related to the traffic condition and the weather condition extracted from the in-vehicle network 226 of the vehicle 102 may be used for generation of informative text messages which are overlaid on the group of related videos, such as the first video 402*a*, the second video 402*b*, and the third video 402*c*, displayed in the OVM 404B.

Figure 4C:
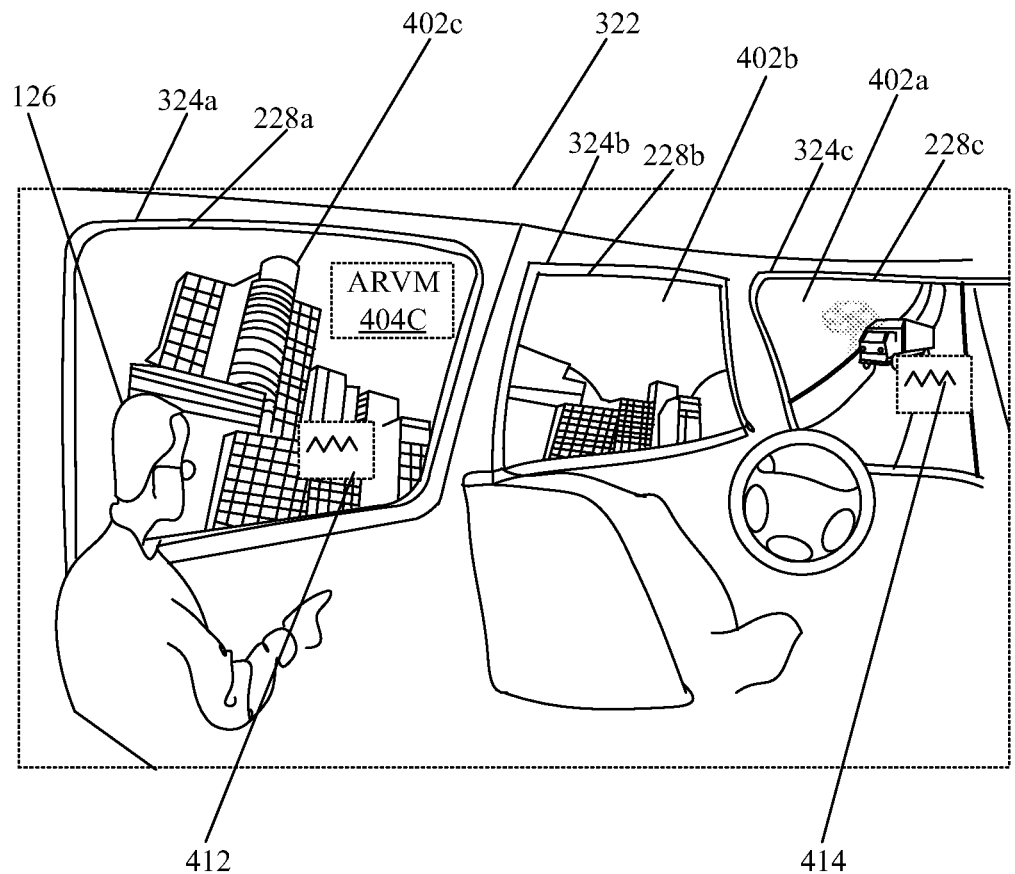

With reference to FIG. 4C, there is shown the interior portion 322 of the vehicle 102 to depict a group of related videos, such as the first video 402*a*, the second video 402*b*, and the third video 402*c*, displayed in an augmented-reality view mode (ARVM) 404C. A first augmented message 412 and a second augmented message 414 is also shown. In an event the ARVM 404C is selected, augmented content related to a current external environment along the current travel route, such as the first travel route 128, may be displayed on one or more videos, such as the first video 402*a*, and the second video 402*b*, as shown. In the ARVM 404C, in addition to the traffic condition and the weather condition, information related to various objects detected in the vicinity of the vehicle 102, tagged information associated with displayed video, map data, passenger information of one or more passengers, such as the first user 126, may be used to generate augmented content.

The first augmented message 412 may be information related to the detected Point of Interest (POI) along the travel route (such as the second travel route 138) associated with the selected video and/or the group of related videos, such as the videos of the first video 402*a*, the second video 402*b*, and the third video 402*c*. The POI may be placed on the detected POI in the displayed video, such as the third video 402*c*. The information related to the POIs may be extracted from the tagged information associated with the displayed video, such as the third video 402*c*. In another example, a name of a road portion (such as name of a road portion of "Tokyo" city) currently viewed on the first video 402*a*, may also be displayed as an augment content, such as the first augmented message 412 or the second augmented message 414. The name of the road portion may be extracted from the map data based on the travel route (such as the second travel route 138) included in the tagged information associated with displayed first video 402a.

The second augmented message 414 may be information related to the detected object in front of the vehicle 102. For example, the second augmented message 414 may be "traffic signal turned "RED" ahead, the vehicle 102 will stop for a while". The microprocessor 202 may further modify a transparency or opacity of a portion of the first video 402a to enable a view of the actual object, such as a traffic signal pole, outside the vehicle 102, to be viewable to the first user 126 through the transparent portion of the first video 402a. The display medium, such as the front windshield 324c may also be a transparent display in such a case. For example, the transparency for the portion of the first video 402a may be dynamically set as "90-100", and the opacity may be set as "0-10".

In the ARVM 404C, the microprocessor 202 of the ECU 120 may be configured to generate an augmented-reality view on one or more windows (such as the left rear window 324a and the left front window 324b) and/or windshields (such as the front windshield 324c) of the vehicle 102. The one or more windows and the windshields may correspond to the one or more display mediums 122. The augmented-reality view may include a view of the selected video, such as the first video 402a, superimposed on one or more external objects, such as the traffic signal pole or other objects, outside the vehicle 102. Thus, the augmented content, such as the first augmented message 412 and the second augmented message 414, may be superimposed on objects within the displayed video and/or actual objects (outside the vehicle 102) captured by in real time or near-real time by one or more video-capture units, such as the video-capture units 124c, by use of the UIs 228a to 228f.

Figure 4D:
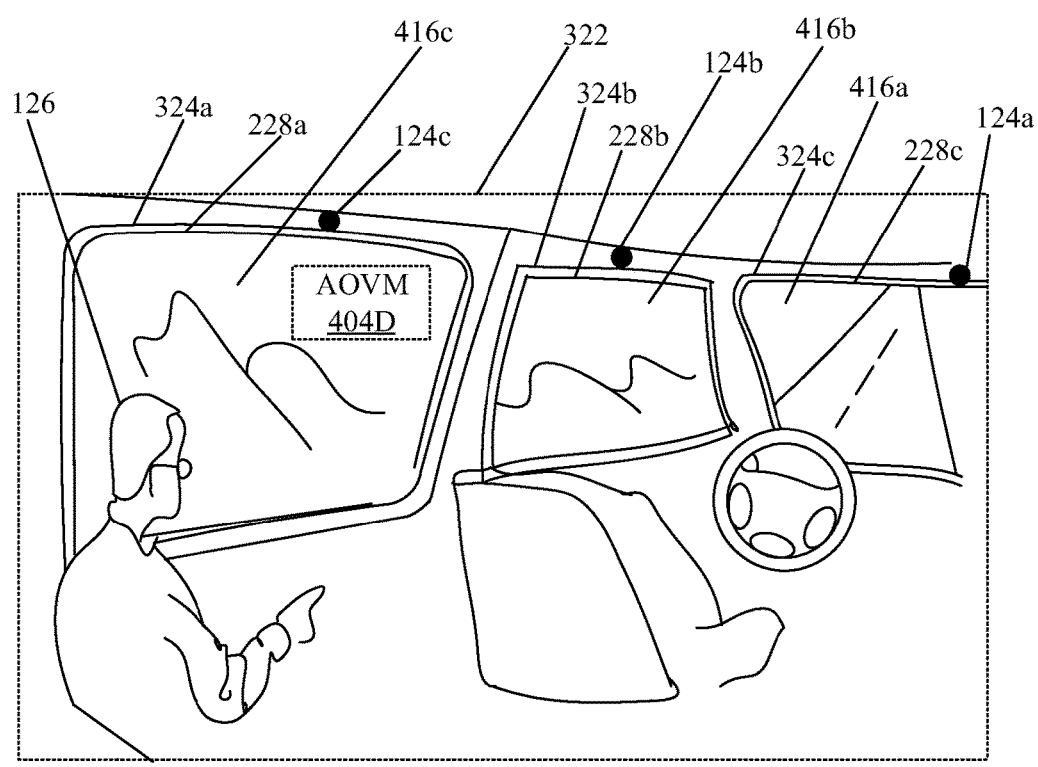

With reference to FIG. 4D, there is shown the interior portion 322 of the vehicle 102 to depict a group of related videos 416a to 416c captured by the video-capture units 124a to 124c of the vehicle 102 in real time or near-real time in an actual outside video mode (AOVM) 404D. The group of related videos 416a to 416c may correspond to the second group of related videos (FIG. 1).

In an event the AOVM 404D is selected, display of the group of related videos 416a to 416c, may be controlled on the one or more display mediums 122 (such as the left rear window 324a, the left front window 324b, and the front windshield 324c, as shown) in the vehicle 102 in motion. The display control may be executed in accordance with the adjusted one or more video parameters of the group of related videos 416a to 416c. In the AOVM 404D, the group of related videos 416a to 416c may be actual videos of outside environment of the vehicle 102 captured by the video-capture units 124a to 124c of the vehicle 102 in an event the vehicle 102 is in motion. In the AOVM 404D, adjustment of the one or more video parameters, such as frame rate and brightness, may be based on a vehicle speed and a degree of curvature of the current travel route, such as the first travel route 128, independent of any other travel route.

Figure 5A:
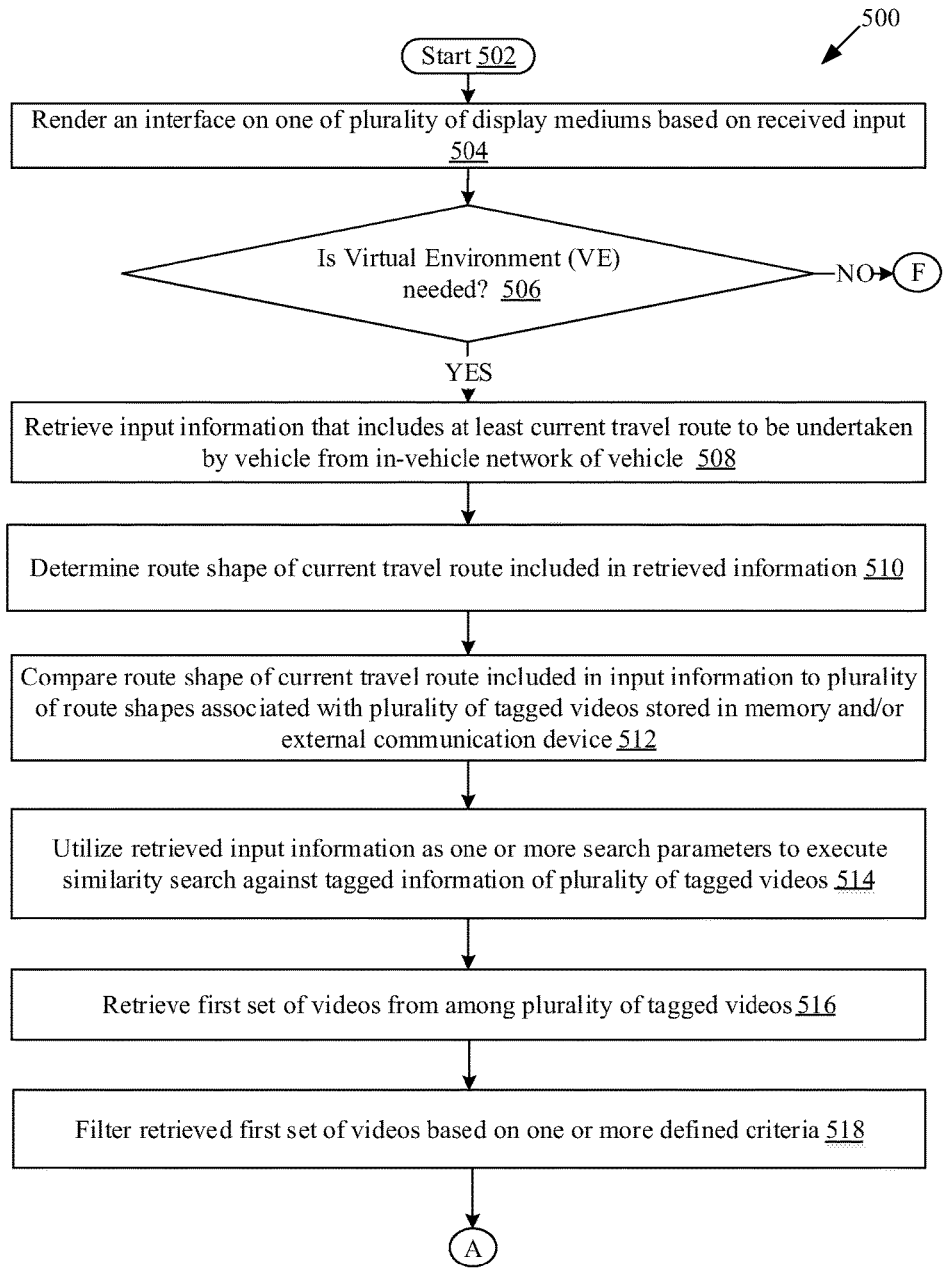
FIGS. 5A, 5B, and 5C, collectively, depict a flow chart that illustrates an exemplary display control method for a vehicle, in accordance with an embodiment of the disclosure.
Figure 5B:
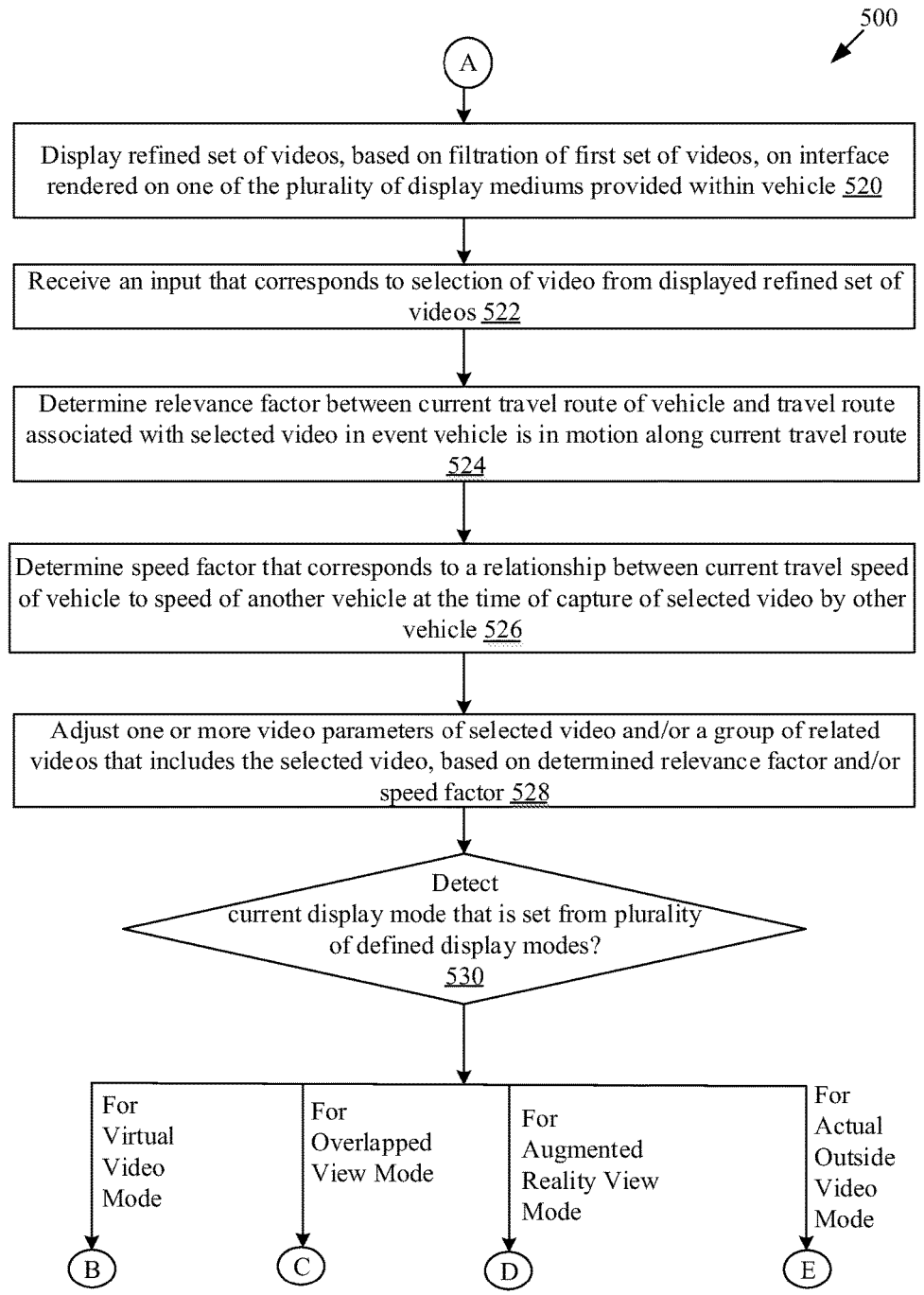
Figure 5C:
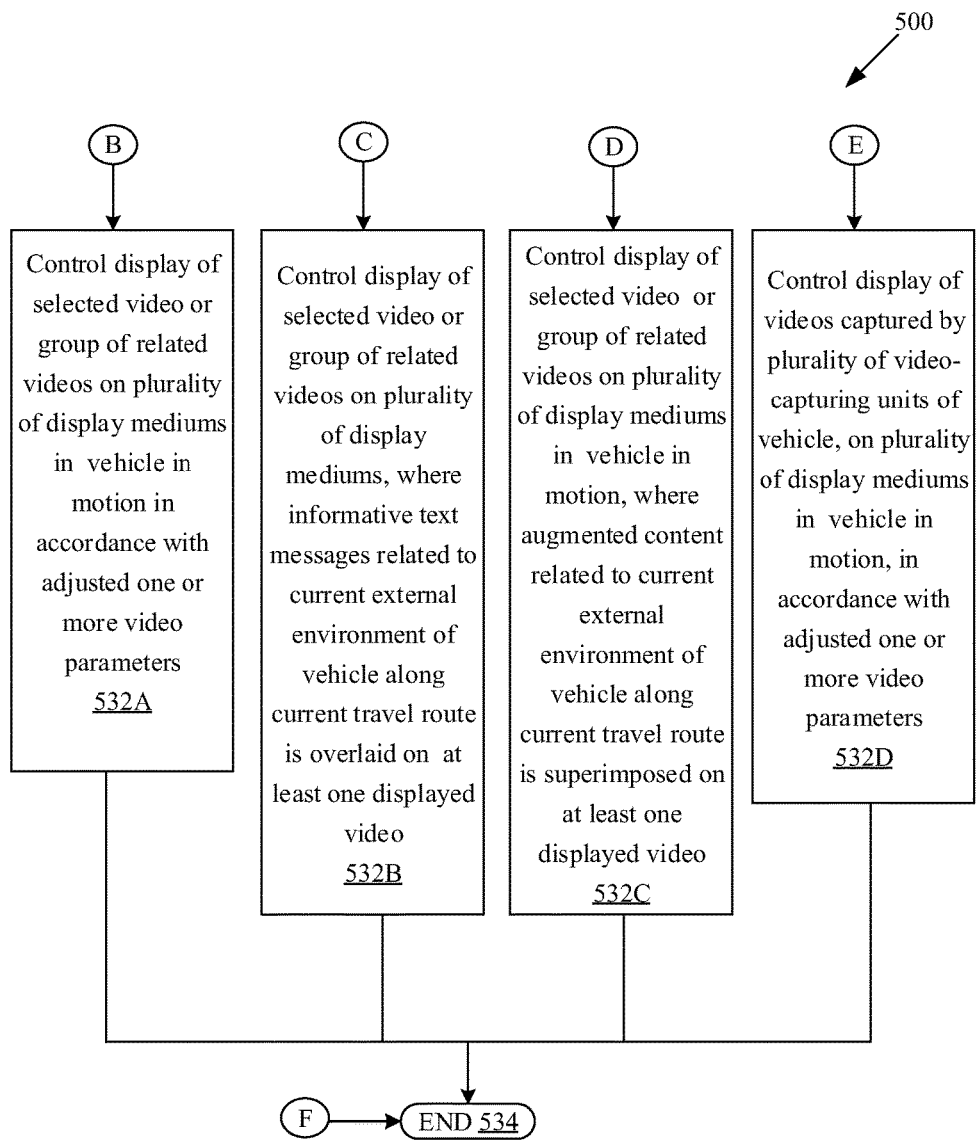

FIGS. 5A and 5B collectively depict a flow chart 500 that illustrates an exemplary display control method for an autonomous vehicle, in accordance with an embodiment of the disclosure. The flow chart 500 is described in conjunction with FIGS. 1, 2, 3A to 3F, and 4A to 4D. The operations of the flow chart 500 may be implemented in an ECU, such as the ECU 120. The method starts at 502 and proceeds to 504.

At 504, an interface, such as the UI 228a, may be rendered on one of a plurality of display mediums, such as the one or more display mediums 122, provided in the vehicle 102. The interface, such as the UI 228a, may be rendered based on an input received by the ECU 120. For instance, the first user 126 may touch a display medium, for example, the left rear window 324a, of the vehicle 102, of the one or more display mediums 122. The microprocessor 202 of the ECU 120 may be configured to render the interface, such as the UI 228a, on the display medium, such as the left rear window 324a, based on the touch input. Alternatively, instead of the tough input, a voice input or a gesture input may be provided by the first user 126 to render the interface. The interface may be rendered with a user prompt, for example, "Do you want a virtual environment?" to seek a "YES" or "NO" confirmation from the first user 126.

At 506, a confirmation whether a virtual environment is needed or not may be received. In an event, the first user 126 provides a "YES" confirmation, control may pass to 508. In an event, the first user 126 provides a "NO" confirmation, control may pass to 534.

At 508, input information may be retrieved from the in-vehicle network 226 of the vehicle 102. The input information may include at least a current travel route (such as the first travel route 128 set by use of the navigation unit) to be undertaken by the vehicle 102. The microprocessor 202 may be configured to retrieve input information from the in-vehicle network 226 of the vehicle 102. In accordance with an embodiment, the input information may also include sensor data extracted from the in-vehicle network 226 of the vehicle 102 during movement of the vehicle 102 along the current travel route. For example, the sensor data may include the total travel time 302b associated with current travel route (such as the first travel route 128 set by use of the navigation unit) and a current speed of the vehicle 102, such as the average speed 302c (as shown in FIG. 3A).

At 510, a route shape (such as the route shape 302a) of the current travel route (such as the first travel route 128) of the vehicle 102 may be determined. The microprocessor 202 of the ECU 120 may be configured to determine the route shape 302a and/or a total number of curvatures in the current travel route included in the retrieved input information.

At 512, the route shape of the current travel route included in the retrieved input information may be compared to a plurality of route shapes associated with plurality of tagged videos. The plurality of tagged videos may be stored in the memory 204 and/or an external communication device, such as the server 114 or the first communication device 110. For example, the microprocessor 202 of the ECU 120 may be configured to compare at least the route shape 302a of the first travel route 128 to a plurality of route shapes associated with the plurality of tagged videos 304 (FIG. 3A).

At 514, the retrieved input information may be utilized as one or more search parameters to execute a similarity search against tagged information of the plurality of tagged videos. For example, the microprocessor 202 may be configured to utilize the retrieved input information as one or more search parameters, such as the search parameters 302, to execute a similarity search against the tagged information 306 of the plurality of tagged videos 304 pre-stored in the memory 204 (as shown in FIG. 3A).

At 516, a first set of videos (such as the first set of videos 308) from among the plurality of tagged videos may be retrieved. For instance, the microprocessor 202 may be configured to retrieve the first set of videos 308 from among the plurality of tagged videos 304 from the memory 204, based on the route shape comparison, as described in FIG. 3A. In accordance with an embodiment, the microprocessor 202 may be configured to utilize additional search parameters, such as the total travel time 302b, the average speed 302c, and/or the route type 302d, of the vehicle 102, for the retrieval of the first set of videos 308 (as shown in FIG. 3A). Alternatively, in accordance with an embodiment, the microprocessor 202 may be configured to retrieve one or more videos of the first set of videos 308 from an external communication device, such as the server 114.

At 518, the retrieved first set of videos (such as the first set of videos 308) may be filtered based on one or more criteria. The one or more criteria may correspond to the sensor data extracted from the in-vehicle network 226 of the vehicle 102 and passenger information of one or more passengers, such as the first user 126, in the vehicle 102. An example of the filtering process based on detected current traffic condition and weather condition (such as the traffic condition parameter 310, and the weather condition parameter 312), is shown and described in FIG. 3B. Another example of a further level of filtering based on the passenger information of one or more passengers, is shown and described in FIG. 3C.

At step 520, a refined set of videos may be displayed on the interface rendered on one of the plurality of display mediums provided within the vehicle 102. The refined set of videos may be obtained based on the filtration of the first set of videos. An example of the refined set of videos, such as the first refined set of videos 314 and/or second refined set of videos 318, is shown and described in the FIG. 3B and 3C.

At 522, an input that corresponds to a selection of a video from the displayed refined set of videos may be received. For example, a list of refined set of videos, such as the second refined set of videos 318, may be displayed on the UI 228a (as shown in the FIG. 3D). The first user 126 seated inside the vehicle 102 in motion may want to experience traveling in a different route or a different environment. The first user 126 may then provide an input to select one of the refined set of videos, such as the second refined set of videos 318, displayed on the UI 228a (as shown and described in the FIG. 3D).

At 524, a relevance factor may be determined between the current travel route of the vehicle 102 and a travel route associated with the selected video. The relevance factor may be determined in an event the vehicle 102 is in motion along current travel route. The relevance factor may be determined by the microprocessor 202, based on a curvature parameter between the current travel route (such as the first travel route 128) and the travel route (such as the second travel route 138) associated with the selected video 320. An example of the determination of the relevance factor has been shown and described in details in the FIG. 3E.

At step 526, a speed factor may be determined. The speed factor may correspond to a relationship between a current travel speed of vehicle 102 and a speed of another vehicle (such as the vehicle 106) at the time of capture of the selected video. For instance, the speed factor may be a ratio of the current travel speed of the vehicle 102 to the speed of a vehicle at the time the selected video 320 was captured.

At 528, one or more video parameters of the selected video and/or a group of related videos that includes the selected video may be adjusted. The adjustment of the one or more video parameters may be executed based on the determined relevance factor and/or the speed factor. The one or more video parameters may include a frame rate and/or brightness values. For example, the set frame rate of the videos 320a to 320c may be increased from 29 frames/second to 100 frames/second at the time of passing the curvature along the first travel route 128 based on the determined relevance factor for the current curvature, to provide and constantly maintain a realistic experience of virtual environment in the vehicle 102. For instance, for each of the plurality of geo-location points 326a to 326n, the adjusted frame rate=(Current frame rate×determined relevance factor×speed factor) (as shown and described in FIGS. 3E and 3F).

At 530, a current display mode that is set from among the plurality of defined display modes, may be detected. The plurality of defined display modes may include the VVM 404A, the OVM 404B, the ARVM 404C, and the AOVM 404D (as shown and described in FIGS. 4A to 4D). The microprocessor 202 may allow selection of one of the plurality of defined display modes based on a touch input, a voice input, or a gesture input. The touch input for the mode selection may be provided on one of the UIs 228a to 228f. In an event the VVM 404A is selected, control may pass to 532A. In an event the OVM 404B is selected, control may pass to 532B. In an event the ARVM 404C is selected, control may pass to 532C. In an event the AOVM 404D is selected, control may pass to 532D.

At 532A, display of the selected video or the group of related videos that includes the selected video may be controlled on the plurality of display mediums (such as the one or more display mediums 122) in the vehicle 102 in motion. The display of the selected video or the group of related videos that includes the selected video may be controlled in accordance with the adjusted one or more video parameters of selected video or the group of related videos that includes the selected video. An example of the display control in the VVM 404A is shown and described in FIG. 4A. The control may then pass to end 534.

At 532B, display of the selected video or the group of related videos that includes the selected video may be controlled on the plurality of display mediums (such as the one or more display mediums 122) in the vehicle 102 in motion. Informative text messages related to the current external environment of the vehicle 102 in motion along the current travel route, may be overlaid on at least one displayed video. The displayed video may correspond to the selected video or one or more of the group of related videos. The display of the selected video or the group of related videos along with the overlaid informative text messages may be controlled in accordance with the adjusted one or more video parameters of selected video or the group of related videos. An example of the display control in the OVM 404B is shown and described in FIG. 4B. The control may then pass to end 534.

At 532C, display of the selected video or the group of related videos that includes the selected video may be controlled on the plurality of display mediums (such as the one or more display mediums 122) in the vehicle 102 in motion. Augmented content related to the current external environment of the vehicle 102 in motion along the current travel route, may be superimposed on at least one displayed video. The displayed video may correspond to the selected video or one or more of the group of related videos. The display of the selected video or the group of related videos along with the superimposed augmented content may be controlled in accordance with the adjusted one or more video parameters of selected video or the group of related videos. An example of the display control in the ARVM 404C is shown and described in FIG. 4C. The control may then pass to end 534.

At 532D, display of a video or a group of related videos captured by the video-capture units 124a to 124f of the vehicle 102 in real time or near-real time, may be controlled on the plurality of display mediums (such as the one or more display mediums 122) in the vehicle 102 in motion. The display control may be executed in accordance with the adjusted one or more video parameters of the video or the group of related videos captured by the video-capture units 124a to 124f of the vehicle 102. An example of the display control in the AOVM 404D is shown and described in FIG. 4D. The control may then pass to end 534.

In accordance with an embodiment of the disclosure, a system to generate a virtual environment in a vehicle, such as the vehicle 102, is disclosed. The system (such as the ECU 120 (FIG. 1)) may comprise one or more circuits (hereinafter referred to as the microprocessor 202 (FIG. 2)). The microprocessor 202 may be configured to receive an input that corresponds to a selection of a video to be displayed on one or more display mediums 122 in the vehicle 102. The microprocessor 202 may be configured to determine a relevance factor between a current travel route (such as the first travel route 128) of the vehicle and a travel route associated with the selected video (such as the second travel route 138) in an event the vehicle 102 is in motion along the current travel route. The microprocessor 202 may be configured to adjust one or more video parameters of the selected video or a group of related videos associated with the selected video, based on the determined relevance factor. The microprocessor 202 may be configured to control display of the selected video or a group of related videos associated with the selected video on the one or more display mediums 122 in the vehicle 102 in motion in accordance with the adjusted one or more video parameters of the selected video or the group of related videos associated with the selected video.

The ECU 120 of the vehicle 102 manages the interactions, such as interactions of the first user 126, with the vehicle 102, by use of the UIs 228a to 228f, rendered on the plurality of display mediums, such as the one or more display mediums 122. The ECU 120 of the vehicle 102 also manages to retrieve a list of suitable tagged videos, such as the second refined set of videos 318, based on the various criteria and parameters, as described in the FIG. 3A to 3C. Thus, in an event a commuter inside the vehicle 102 does not likes the external or internal environment from within the vehicle 102 or wants to experience a virtual environment or a climatic condition that is different from the current environment around of the vehicle 102, a special-purpose hardware unit, such as the ECU 120, creates a virtual environment in the vehicle 102 during an autonomous ride as per the choice of the in-vehicle user, such as the first user 126.

Unlike a basic display function of a display medium to display a video captured by a video-capture unit, such as the video-capture units 124a to 124f, the ECU 120 controls how the selected video or the group of related videos associated with a different travel route, such as the second travel route 138, are displayed within the vehicle 102 during a drive. The ECU 120 controls the display of the selected video or the group of related videos on all the display mediums, such as the one or more display mediums 122 in a smooth and synchronized manner even if the current travel route may not be same (may be similar but not same) as the travel route associated with the selected video. The ability of the ECU 120 to control display of the videos in accordance with the adjusted one or more video parameters of the selected video or the group of related videos, overcomes at least the problem of how to display video captured from another video-capturing device of a different vehicle or the same vehicle but at a different point in time in a different route. The microprocessor 202 determines the relevance factor between the current travel route (such as the first travel route 128) of the vehicle 102 and a travel route associated with the selected video (such as the second travel route 138) in an event the vehicle 102 is in motion along the current travel route. The adjustment of the one or more video parameters is executed based on at least the determined relevance factor, which provides an improved, intelligent, and a self-adaptive display system, which is turn provides smooth and enhanced viewing experience to the in-vehicle user, such as the first user 126, in an event the vehicle 102 is in motion. The in-vehicle users, such as the first user 126, may feel as if they are travelling in different environment or climatic condition, such as a different city or a different climatic condition of choice.

In accordance with an embodiment of the disclosure, a vehicle (such as the vehicle 102 (FIGS. 1 and 2) to generate a virtual environment within the vehicle is disclosed. The vehicle may comprise an ECU (such as the ECU 120 (FIGS. 1 and 2)) and the one or more display mediums 122 that may be communicatively coupled to the ECU 120. The ECU may comprise one or more circuits (hereinafter referred to as the microprocessor 202 (FIG. 2) configured to receive an input that corresponds to a selection of a video to be displayed on one or more display mediums 122 in the vehicle 102. The microprocessor 202 may be configured to determine a relevance factor between a current travel route (such as the first travel route 128) of the vehicle and a travel route associated with the selected video (such as the second travel route 138) in an event the vehicle 102 is in motion along the current travel route. The microprocessor 202 may be configured to adjust one or more video parameters of the selected video or a group of related videos associated with the selected video, based on the determined relevance factor. The microprocessor 202 may be configured to control display of the selected video or a group of related videos associated with the selected video on the one or more display mediums 122 in the vehicle 102 in motion in accordance with the adjusted one or more video parameters of the selected video or the group of related videos associated with the selected video.

Various embodiments of the disclosure may provide a non-transitory computer readable medium and/or storage medium having stored thereon, a set of computer-executable instructions to cause a machine and/or a computer to generate a virtual environment in a vehicle (such as the vehicle 102). The set of computer-executable instructions in an ECU (such as the ECU 120) may cause the machine and/or computer to perform the operations that comprise receipt of an input by the ECU 120 of the vehicle 102. The input may correspond to a selection of a video to be displayed on one or more display mediums 122 in the vehicle 102. The vehicle 102 may be an autonomous vehicle or a semi-autonomous vehicle. A relevance factor may be determined between a current travel route of the vehicle 102 and a travel route associated with the selected video. The relevance factor may be determined in an event the vehicle 102 is in motion along the current travel route. One or more video parameters of at least the selected video may be adjusted based on the determined relevance factor. Display of the selected video on the one or more display mediums 122 in the vehicle 102 in motion may be controlled in accordance with the adjusted one or more video parameters of at least the selected video.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A system for a vehicle, comprising:
   one or more circuits in an electronic control unit (ECU) for said vehicle, said one or more circuits configured to:
   receive an input that corresponds to a selection of a video to be displayed on one or more display mediums in said vehicle;
   determine a relevance factor between a current travel route of said vehicle and a travel route associated with said selected video in an event said vehicle is in motion along said current travel route;
   adjust one or more video parameters of said selected video based on said determined relevance factor; and
   control display of at least said selected video on said one or more display mediums in said vehicle in motion in accordance with said adjusted one or more video parameters of said selected video.

2. The system according to claim 1, wherein said relevance factor is determined based on a curvature parameter between said current travel route and said travel route associated with said selected video.

3. The system according to claim 1, wherein said relevance factor is a ratio between a first degree of curvature of a portion of said current travel route of said vehicle and a second degree of curvature of a corresponding portion of said travel route associated with said selected video.

4. The system according to claim 1, wherein said one or more circuits in said ECU are further configured to retrieve an input information that includes at least said current travel route to be undertaken by said vehicle.

5. The system according to claim 4, wherein said one or more circuits in said ECU are further configured to retrieve a first set of videos, from at least one of a memory or an external communication device communicatively coupled to said ECU, based on a similarity search of said input information against tagged information of a plurality of tagged videos stored in said at least one of said memory or said communication device.

6. The system according to claim 5, wherein said one or more circuits in said ECU are further configured to compare a route shape of said current travel route included in said input information to a plurality of route shapes associated with said plurality of tagged videos for said retrieval of said first set of videos.

7. The system according to claim 5, wherein said one or more circuits in said ECU are further configured to filter said retrieved first set of videos based on one or more criteria, wherein said one or more criteria corresponds to one of sensor data extracted from an in-vehicle network of said vehicle and passenger information of one or more passengers in said vehicle.

8. The system according to claim 7, wherein said sensor data corresponds to one or both of a traffic condition and a weather condition detected by a plurality of sensors provided in said vehicle during motion of said vehicle along said current travelling route.

9. The system according to claim 7, wherein said one or more circuits in said ECU are further configured to assign a priority to said one or more criteria for said filtration of said retrieved first set of videos.

10. The system according to claim 7, wherein said one or more circuits in said ECU are further configured to display a refined set of videos, based on said filtration of said first set of videos, on an interface rendered on a display screen of said one or more display mediums provided within said vehicle, wherein said input that corresponds to said selection of said video corresponds to selection of one of said refined set of videos displayed on said interface.

11. The system according to claim 1, wherein said adjustment of said one or more video parameters of said selected video is further based on a current speed of said vehicle.

12. The system according to claim 1, wherein said adjustment of said one or more video parameters of said selected video corresponds to a dynamic adjustment of a frame rate of said selected video during display of said selected video on said one or more display mediums in said vehicle in motion, based on said determined relevance factor.

13. The system according to claim 1, wherein said one or more display mediums in said vehicle are arranged such that a natural view of an external environment of said vehicle is selectively restricted to one or more passengers from within said vehicle, during said display of said selected video on said one or more display mediums in said vehicle in motion.

14. The system according to claim 1, wherein said one or more circuits in said ECU are further configured to control display of said selected video on said one or more display mediums in said vehicle in motion along said current travel route in a first geographical area, such that a virtual environment of a second geographic area related to said travel route of said selected video is created within said vehicle during said display of said selected video.

15. The system according to claim 1, wherein said one or more circuits in said ECU are further configured to generate an augmented-reality view on one or more windows and/or windshields of said vehicle that corresponds to said one or more display mediums, wherein said augmented-reality view comprises a view of said selected video superimposed on one or more external objects outside said vehicle.

16. The system according to claim 1, wherein said vehicle is one of: an autonomous vehicle or a semi-autonomous vehicle.

17. A display control method to generate a virtual environment in a vehicle, comprising:
  receiving, by an electronic control unit (ECU) of said vehicle, an input that corresponds to a selection of a video to be displayed on one or more display mediums in said vehicle;
  determining, by said ECU, a relevance factor between a current travel route of said vehicle and a travel route associated with said selected video in an event said vehicle is in motion along said current travelling route;
  adjusting, by said ECU, one or more video parameters of said selected video based on said determined relevance factor; and
  controlling, by said ECU, display of said selected video on said one or more display mediums in said vehicle in motion in accordance with said adjusted one or more video parameters of said selected video.

18. A vehicle, comprising:
  an electronic control unit (ECU); and
  one or more display mediums communicatively coupled to said ECU, wherein said ECU comprises one or more circuits configured to:
    receive an input that corresponds to a selection of a video to be displayed on said one or more display mediums provided in said vehicle;
    determine a relevance factor between a current travel route of said vehicle and a travel route associated with said selected video in an event said vehicle is in motion along said current travelling route;
    adjust one or more video parameters of said selected video based on said determined relevance factor; and
    control display of said selected video on said one or more display mediums in said vehicle in motion in accordance with said adjusted one or more video parameters of said selected video.

19. The vehicle according to claim 18, wherein said vehicle is one of an autonomous vehicle or a semi-autonomous vehicle.

20. The vehicle according to claim 18, wherein said vehicle is a non-autonomous vehicle.

* * * * *